(12) United States Patent
Zhang et al.

(10) Patent No.: US 12,106,491 B2
(45) Date of Patent: Oct. 1, 2024

(54) TARGET TRACKING METHOD AND APPARATUS, MEDIUM, AND DEVICE

(71) Applicant: Tencent Technology (Shenzhen) Company Limited, Shenzhen (CN)

(72) Inventors: Hao Zhang, Shenzhen (CN); Zhiwei Niu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1031 days.

(21) Appl. No.: 17/063,997

(22) Filed: Oct. 6, 2020

(65) Prior Publication Data

US 2021/0019627 A1 Jan. 21, 2021

Related U.S. Application Data

(63) Continuation of application No. PCT/CN2019/093793, filed on Jun. 28, 2019.

(30) Foreign Application Priority Data

Sep. 14, 2018 (CN) .......................... 201811076284.7

(51) Int. Cl.
*G06N 3/08* (2023.01)
*G06T 7/246* (2017.01)
*G06V 20/40* (2022.01)

(52) U.S. Cl.
CPC .............. *G06T 7/246* (2017.01); *G06N 3/08* (2013.01); *G06V 20/41* (2022.01)

(58) Field of Classification Search
CPC . G06N 3/08; G06N 3/04; G06N 3/063; G06F 18/213; G06V 20/41; G06T 7/246
See application file for complete search history.

(56) References Cited

U.S. PATENT DOCUMENTS 7,746,380 B2   6/2010  Maruya et al.
9,443,320 B1 * 9/2016  Gaidon ..................... G06T 7/20
(Continued)

FOREIGN PATENT DOCUMENTS

CN    102638675 A    8/2012
CN    104767911 A    7/2015
(Continued)

OTHER PUBLICATIONS

Atif Ilyas et al., "A Combined Motion and Appearance Model for Human Tracking in Multiple Cameras Environment", Emerging Technologies, 2010 6th International Conference on Emerging Technologies (Icet), 18OCT2010, XP031803651, 6 pgs.
(Continued)

*Primary Examiner* — Kamran Afshar
*Assistant Examiner* — Brian J Hales
(74) *Attorney, Agent, or Firm* — Morgan, Lewis & Bockius LLP

(57) ABSTRACT

Embodiments of this application disclose a target tracking method performed at an electronic device. The electronic device obtains a first video stream and detects candidate regions within a current video frame in the first video stream. The electronic device then extracts, from the candidate regions, a deep feature corresponding to each candidate region and calculates a feature similarity for each candidate region and a deep feature of a target detected in a previous video frame. Finally, the electronic device determines, based on the feature similarity corresponding to the candidate region, that the target is detected in the current video frame. Target detection is performed in a range of video frames by using a target detection model, and target tracking is performed based on the deep feature, so that occurrence of cases such as a target tracking drift or loss can (Continued)

be effectively prevented, to ensure the accuracy of target tracking.

19 Claims, 9 Drawing Sheets

(56) References Cited

U.S. PATENT DOCUMENTS

| | | | |
|---|---|---|---|
| 2004/0257444 | A1 | 12/2004 | Maruya et al. |
| 2015/0172604 | A1 | 6/2015 | Kim |
| 2016/0366308 | A1* | 12/2016 | Liu .................. G06T 7/248 |
| 2016/0377698 | A1 | 12/2016 | Nielsen et al. |
| 2017/0289505 | A1* | 10/2017 | Johnson ............. G06T 7/292 |
| 2018/0032846 | A1* | 2/2018 | Yang .................. G06N 3/08 |
| 2018/0158210 | A1 | 6/2018 | Estrada et al. |
| 2018/0211401 | A1* | 7/2018 | Lee .................... G06T 7/593 |

FOREIGN PATENT DOCUMENTS

| | | |
|---|---|---|
| CN | 107862705 A | 3/2018 |
| CN | 108257158 A | 7/2018 |
| CN | 108492316 A | 9/2018 |
| CN | 108509859 A | 9/2018 |
| CN | 109325967 A | 2/2019 |
| JP | 2013020616 A | 1/2013 |
| JP | 2017134617 A | 8/2017 |

OTHER PUBLICATIONS

Tencent Technology, European Office Action, EP Patent Application No. 19861095.8, 25APR2023, 8 pgs.

Tencent Technology, WO, PCT/CN2019/093793, Sep. 9, 2019, 5 pgs.

Tencent Technology, IPRP, PCT/CN2019/093793, Mar. 9, 2021, 6 pgs.

Tencent Technology, ISR, PCT/CN2019/093793, Sep. 9, 2019, 2 pgs.

Q. Cai et al., "Automatic Tracking of Human Motion in Indoor Scenes Across Multiple Synchronized Video Streams", 6th International Conference on Computer Vision. ICCV, Bombay, Jan. 4-7, 1998, XP000883789, ISBN: 978-0-7803-5098-4, 7 pgs.

Extended European Search Report, EP19861095.8, Jul. 20, 2021, 13 pgs.

Kosuke Sato et al., "CAD-based Object Tracking with Distributed Monocular Camera for Security Monitoring", Proceedings of the 1994 Second CAD-based Vision Workshop, Pennsylvania, Jan. 1, 1994, XP055278149, ISBN: 978-0-8186-5310-0, 7 pgs.

Ngoc-Bao Nguyen et al., "Person Re-Identification with Pre-trained Deep Learning Models and Attribute Correlations", 2016 International Symposium on Electronics and Smart Devices (ISESD), IEEE, Nov. 29, 2016, XP033081179, 6 pgs.

Ying-Cong Chen et al., "Person Re-Identification by Camera Correlation Aware Feature Augmentation", Arxiv.Org, Cornell University Library, 201 Olin Library, Cornell University, Ithaca, NY 14853, Mar. 26, 2017, XP080759701, 15 pgs.

* cited by examiner

TARGET TRACKING METHOD AND APPARATUS, MEDIUM, AND DEVICE

CROSS REFERENCE TO RELATED APPLICATIONS

This application is a continuation application of PCT Patent Application No. PCT/CN2019/093793, entitled "TARGET TRACKING METHOD, APPARATUS, MEDIUM, AND DEVICE" filed on Jun. 28, 2019, which claims priority to Chinese Patent Application No. 201811076284.7, filed with the State Intellectual Property Office of the People's Republic of China on Sep. 14, 2018, and entitled "TARGET TRACKING METHOD AND APPARATUS, MEDIUM, AND DEVICE", all of which are incorporated herein by reference in their entirety.

FIELD OF THE TECHNOLOGY

Embodiments of this application relate to the field of computer visual technologies, and in particular, to a target tracking method and apparatus, a computer storage medium, and a device.

BACKGROUND OF THE DISCLOSURE

Target tracking is one of the hotspots in the field of computer vision research. Target tracking is widely used in a plurality of fields such as video surveillance, navigation, military, human-computer interaction, virtual reality, and autonomous driving. Simply put, target tracking is to analyze and track a given target in a video to determine an exact location of the target in the video.

Related target tracking methods are mostly classic tracking methods based on the tracking principle of a correlation filter. In the tracking method, a correlation filter is updated according to a region of a target detected in a previous frame of the video, and then target tracking is performed on a current video frame according to the updated correlation filter. In the tracking process, the correlation filter determines a tracking range of the current video frame according to the region of the target detected in the previous frame, and performs target tracking in the current video frame by using a shape feature as a basis in a manner of a local sliding window in the tracking range.

Due to the uncontrollability of the movement of the target, and a large change in a target region range, a tracking drift or loss of the target may occur when the moving target is tracked in the manner of a local sliding window.

SUMMARY

Embodiments of this application provide a target tracking method and apparatus, a medium, and a device, to effectively prevent occurrence of cases such as losing a tracking target and a tracking drift, to ensure the accuracy of target tracking.

In view of this, a first aspect of the embodiments of this application provides a target tracking method, performed by an electronic device having a processor and memory connected to the processor and storing processor-executable instructions, the method including:

obtaining, by the electronic device, a first video stream;

detecting, by the electronic device, according to a target detection model and within a current video frame in the first video stream, candidate regions in the current video frame;

extracting, by the electronic device, according to a feature extraction model and from the candidate regions, deep features corresponding to the candidate regions, the feature extraction model being an end-to-end neural network model that uses an image as an input and uses a deep feature of a movable body in the image as an output;

calculating, by the electronic device, feature similarities between the deep features corresponding to the candidate regions in the current video frame and deep features corresponding to a target detected in a previous video frame; and determining, by the electronic device and according to the feature similarities, that the target is detected in the current video frame.

A second aspect of the embodiments of this application provides a non-transitory computer-readable storage medium storing a plurality of processor-executable instructions in connection with an electronic device having a processor. The plurality of processor-executable instructions, when executed by the processor, cause the electronic device to perform the target tracking method according to the foregoing first aspect.

A third aspect of the embodiments of this application provides an electronic device comprising a processor, memory connected to the processor, and processor-executable instructions stored in the memory that, when executed by the processor, cause the electronic device to perform the target tracking method according to the foregoing first aspect.

It can be learned from the foregoing technical solutions that the embodiments of this application have the following advantages:

The embodiments of this application provide a target tracking method. In the target tracking method, target detection is performed in an overall range of the current video frame by using the target detection model, to determine all candidate regions existing in the current video frame, so as to determine a tracking target based on the determined candidate regions. As compared with the related art in which a target tracking range of a current video frame is determined according to a target region of a previous video frame, and target tracking is performed only in the target tracking range, in the embodiments of this application, the candidate regions are determined in the overall range of the video frame by using the target detection model, and the range of target tracking is enlarged, so that occurrence of a case of losing a tracking target due to excessively fast movement of the tracking target can be effectively prevented. In addition, in the target tracking method provided in the embodiments of this application, deep features of the determined candidate regions are extracted by using the feature extraction model, and the target is determined based on the deep features of the candidate regions and the deep feature of the target detected in the previous video frame. As compared with the related art in which target tracking is performed only based on a morphological feature, in the embodiments of this application, the tracking target is determined based on the deep feature, so that it can be ensured that the determined tracking target is more accurate, and occurrence of a case of a tracking drift can be effectively prevented.

DESCRIPTION OF EMBODIMENTS

Figure 1:
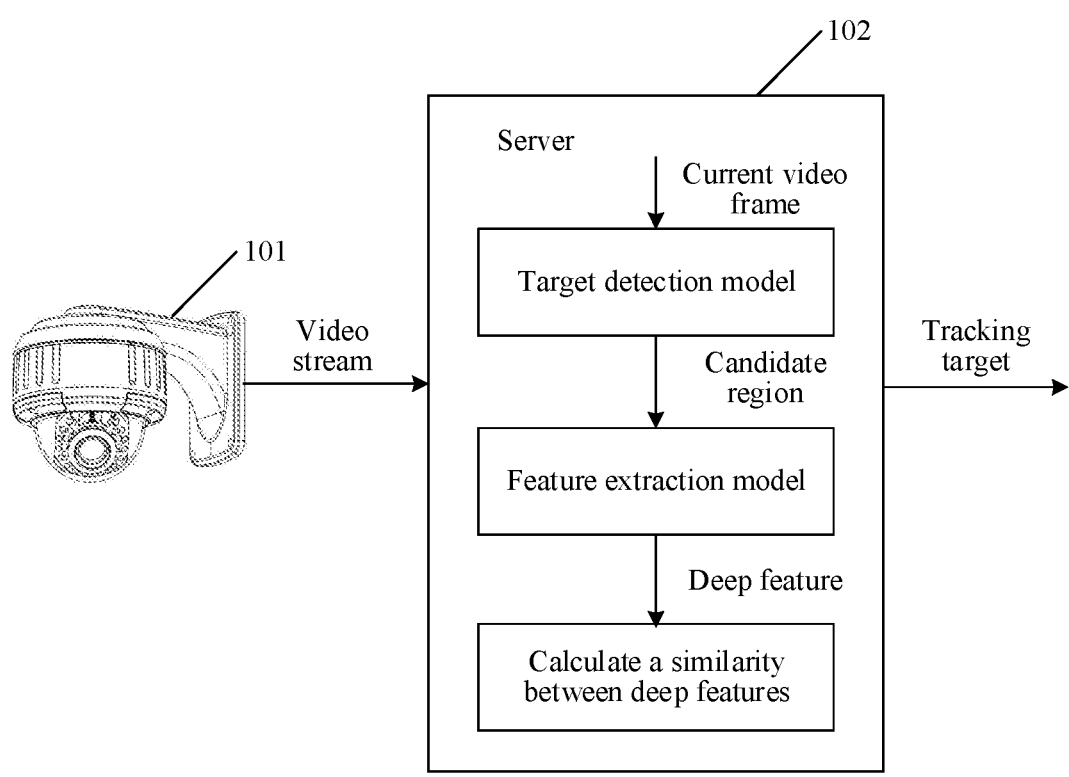
FIG. 1 is a schematic diagram of an application scenario of a target tracking method according to an embodiment of this application.

To make solutions in the embodiments of this application more comprehensible for a person skilled in the art, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of the embodiments of this application.

In the specification, claims, and accompanying drawings of this application, the terms "first", "second", "third", "fourth", and the like (if existing) are intended to distinguish between similar objects rather than describe a specific sequence or a precedence order. Data used in this way is interchangeable in a suitable case, so that the embodiments of this application described herein can be implemented, for example, in a sequence other than the sequences depicted or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In the related tracking method based on the tracking principle of the correlation filter, in the process of tracking a target, there are technical problems that a tracking drift and loss of a tracking target easily occur. For the technical problems existing in the related art, the embodiments of this application provide a target tracking method.

The following first describes the core technical idea of the target tracking method provided in the embodiments of this application.

In the target tracking method provided in the embodiments of this application, target tracking is performed in a video frame included in an obtained video stream based on a target detection model and a feature extraction model. When target tracking is specifically performed for a video frame in a video stream, detection is first performed in an overall range of the video frame by using the target detection model, to obtain all candidate regions existing in the video frame; then feature extraction is performed on all the detected candidate regions by using the feature extraction model, to obtain a deep feature corresponding to each candidate region; next, a feature similarity between each candidate region and a tracking target is calculated based on the deep feature corresponding to the each candidate region and a deep feature of a target detected in a previous video frame, and the tracking target in the video frame is further determined according to the feature similarity corresponding to the each candidate region. In machine learning, a feature is an individual measurable property or characteristic of a phenomenon being observed such as a target detected within a video frame. Features are usually numeric, but structural features such as strings and graphs are used in syntactic pattern recognition. A deep feature is a consistent response of a node or layer within a hierarchical neural network model to an input that gives a response that's relevant to the model's final output.

In the target tracking method provided in the embodiments of this application, target detection is performed in an overall range of the current video frame by using the target detection model, to determine all candidate regions existing in the current video frame, so as to determine a tracking target based on the determined candidate regions. As compared with the related art in which a target tracking range of a current video frame is determined according to a target region of a previous video frame, and target tracking is performed only in the target tracking range, in the embodiments of this application, the candidate regions are determined in the overall range of the video frame by using the target detection model, and the range of target tracking is enlarged, so that occurrence of a case of losing a tracking target due to excessively fast movement of the tracking target can be effectively prevented. In addition, in the target tracking method provided in the embodiments of this application, deep features of the determined candidate regions are extracted by using the feature extraction model, and the tracking target is determined based on the deep features of the candidate regions and the deep feature of the target detected in the previous video frame. As compared with the related art in which target tracking is performed only based on a morphological feature, in the embodiments of this application, the tracking target is determined based on the deep feature, so that it can be ensured that the determined tracking target is more accurate, and occurrence of a case of a tracking drift can be effectively prevented.

It is to be understood that, the target tracking method provided in the embodiments of this application may be applied to an electronic device having an image processing function, such as a terminal device or a server. The terminal device may be specifically a computer, a smartphone, a personal digital assistant (PDA), a tablet computer, or the like. The server may be specifically an application server, or a Web server. During actual application deployment, the server may be an independent server, or a cluster server. The server may simultaneously provide target tracking services for a plurality of terminal devices.

To help understand the technical solutions provided in the embodiments of this application, the following describes a target tracking method provided in the embodiments of this application with reference to an actual application scenario by using a server as an execution body.

FIG. 1 is a schematic diagram of an application scenario of a target tracking method according to an embodiment of this application. The application scenario includes a surveillance camera 101 and a server 102. The surveillance camera 101 is configured to send a video stream recorded by the surveillance camera 101 to the server 102. The server 102 is configured to perform the target tracking method provided in this embodiment of this application, to perform target tracking in video frames included in the video stream sent by the surveillance camera 101.

When a user needs to track a target in the video stream recorded by the surveillance camera 101, the server 102 retrieves the video stream shot by the surveillance camera 101, and performs the following data processing for each video frame in the video stream: the server 102 first performs detection in an overall range of a current video frame by using a target detection model, to obtain all candidate regions existing in the video frame; the server 102 then extracts deep features respectively corresponding to all the candidate regions in the current video frame by using a feature extraction model, and calculates a feature similarity corresponding to each candidate region according to the deep feature corresponding to the each candidate region and a deep feature of the target detected in a previous video frame; and the server 102 further determines, according to the feature similarity corresponding to the each candidate region, the target detected in the previous video frame.

The server 102 first performs target detection in the overall range of the current video frame by using the target detection model, to determine all the candidate regions existing in the current video frame, and then performs target tracking based on all the determined candidate regions, thereby enlarging a target tracking range in each video frame, so that occurrence of a case of losing a tracking target due to excessively fast movement of the tracking target can be effectively prevented. In addition, the server 102 also extracts the deep features of the candidate regions by using the feature extraction model, and determines the tracking target in the current video frame based on the deep features of the candidate regions and the deep feature of the target detected in the previous video frame. The deep feature can reflect the feature of the tracking target from a deeper level, and the deep feature does not change with a change of a feature such as a form of the tracking target. Therefore, performing target tracking based on the deep feature can ensure that the determined tracking target is more accurate, and effectively prevent a case of a tracking drift.

The scenario shown in FIG. 1 is only an example. During actual application, the target tracking method provided in this embodiment of this application may also be applied to a terminal device, and no specific limitation is imposed on an application scenario of the target tracking method.

The following describes, through embodiments, the target tracking method provided in this application.

Figure 2:
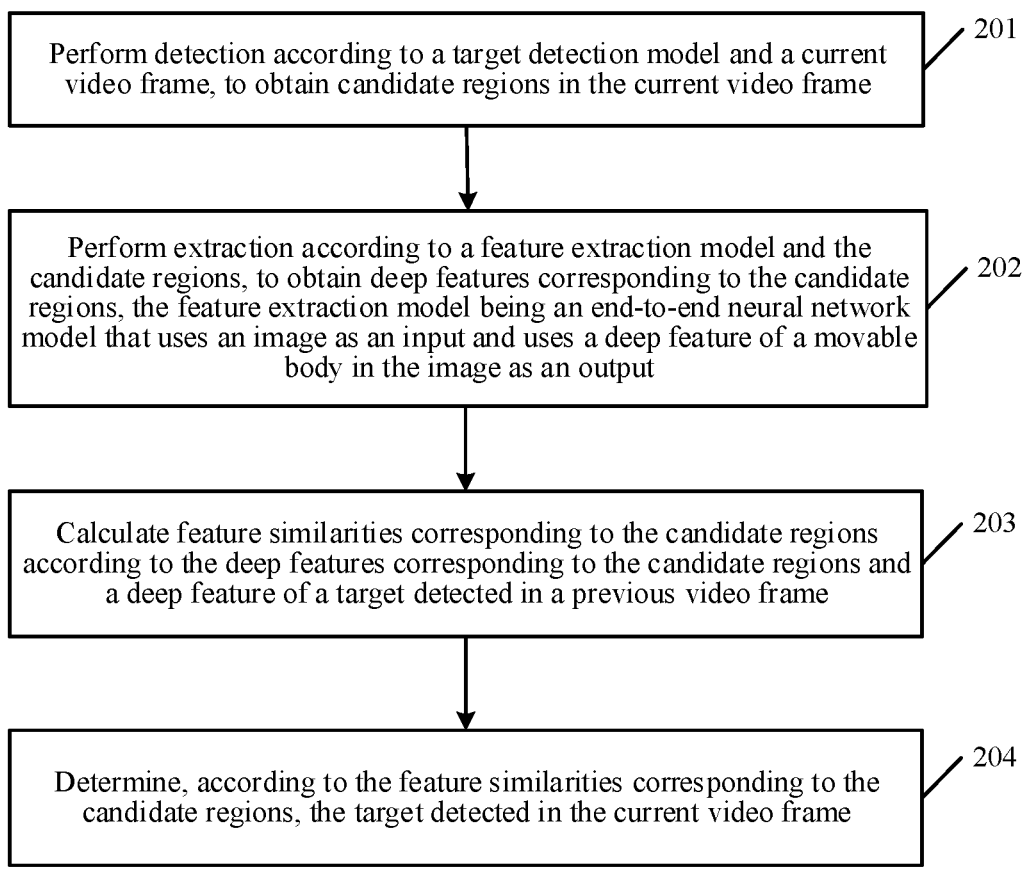
FIG. 2 is a schematic flowchart of a target tracking method according to an embodiment of this application.

FIG. 2 is a schematic flowchart of a target tracking method according to an embodiment of this application. For ease of description, in this embodiment, description is made by using a server as an execution body. It is to be understood that the execution body of the target tracking method is not limited only to a server, but also may be applied to a device having an image processing function such as a terminal device.

When the server needs to perform target tracking for a first video stream, the server obtains the first video stream, and performs a data processing procedure shown in FIG. 2 for a video frame in the first video stream, to track a target in the first video stream.

In a possible implementation, the server may retrieve a historical video stream from a video stream database as the first video stream. During specific implementation, a server may retrieve, according to a camera tag corresponding to the first video stream and shooting start and end times of the first video stream, the first video stream from historical video streams stored in the video stream database. The video stream database is used for storing data of video streams shot by a plurality of cameras. Further, the data processing procedure shown in FIG. 2 is performed for a video frame in the obtained first video stream, to implement target tracking in the first video stream.

In another possible implementation, the server may obtain, in real time, a video stream shot by a camera as the first video stream. During specific implementation, the server may initiate a video stream obtaining request to a camera, to request to obtain a video stream shot, in real time, by the camera as the first video stream. Correspondingly, the camera sends the first video stream shot, in real time, by the camera to the server in response to the obtaining request initiated by the server, so that the server performs the data processing procedure shown in FIG. 2 for a video frame in the first video stream, to implement target tracking in the first video stream.

It is to be understood that, the server may also obtain the first video stream in other manners. A specific manner of obtaining the first video stream is not limited herein.

After obtaining the first video stream, the server performs the data processing procedure shown in FIG. 2 for each video frame in the first video stream. As shown in FIG. 2, the data processing procedure specifically includes the following steps:

Step 201. The server performs detection according to a target detection model and a current video frame, to obtain candidate regions in the current video frame.

When performing target tracking for a video frame in the first video stream, the server uses the video frame as the current video frame, and inputs the current video frame into the target detection model. The target detection model performs object detection in an overall range of the current video frame, to obtain all candidate regions existing in the current video frame. The candidate regions are regions in which detection objects in the current video frame are located, and a target needing to be tracked may exist in the detection objects included in the candidate regions.

The target detection model is an end-to-end neural network. The target detection model uses a video frame as an input, and uses a border box of a detection object in the video frame and a category of the detection object as an output. That is, the current video frame is inputted into the target detection model, and the target detection model performs corresponding processing on the current video frame, and can output a border box of each detection object in the current video frame and a category of the each detection object, and a region enclosed by the border box of the each detection object is a candidate region.

It is to be understood that, the target detection model can detect all candidate regions in the current video frame, each candidate region includes a detection object, and the detection object may be specifically a person or an article, that is, the target detection model can detect detection objects of various types.

Figure 3:
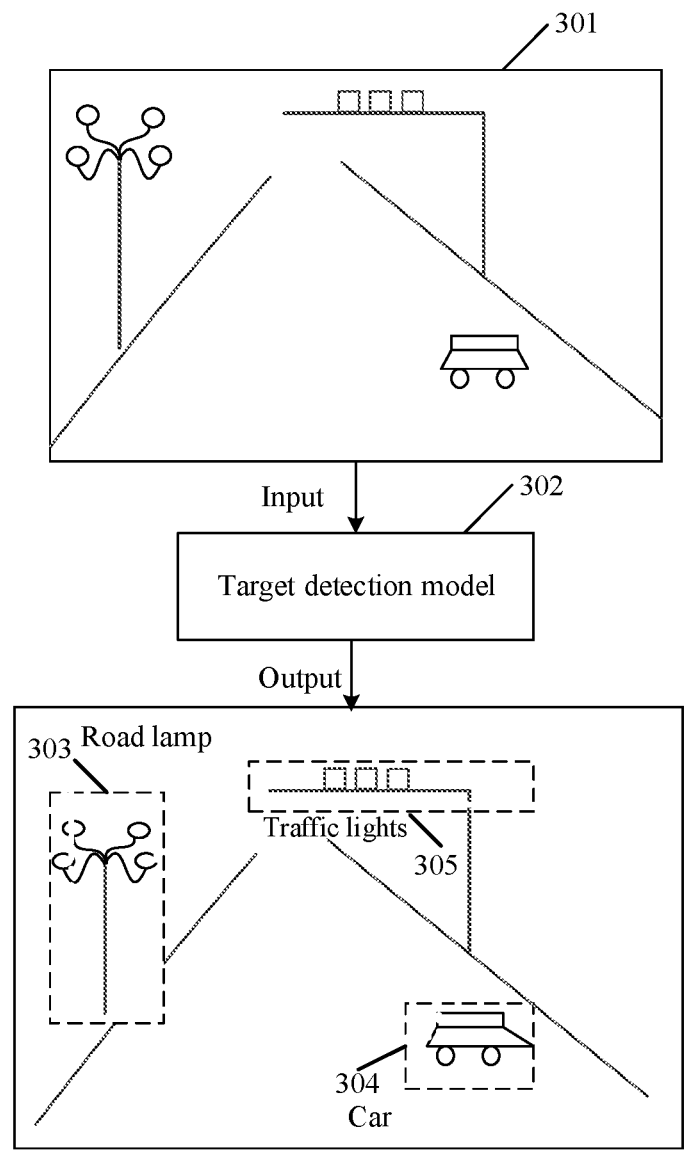
FIG. 3 is a schematic diagram of a working effect of a target detection model according to an embodiment of this application.

To help understand the working effect of the target detection model, the following describes an output result of the target detection model with reference to FIG. 3 by using examples.

As shown in FIG. 3, a video frame 301 is inputted into a target detection model 302, the target detection model 302 performs corresponding processing on the video frame 301, and can mark, in the video frame 301, border boxes of detection objects included in the video frame 301. As shown in FIG. 3, after processing by the target detection model 302, a border box 303, a border box 304, and a border box 305 are marked in the video frame 301, and it is annotated beside the border box 303 that an article category in the border box 303 is a road lamp, it is annotated beside the border box 304 that an article category in the border box 304 is a car, and it is annotated beside the border box 305 that an article category in the border box 305 is traffic lights.

It is to be understood that, the output result of the target detection model shown in FIG. 3 is only an example. During actual applications, the target detection model can detect all the candidate regions in the video frame. For ease of description, not all candidate regions detected by the target detection model are marked in FIG. 3.

In a possible implementation, the target detection model may include a basic network and an auxiliary network. The basic network uses a lightweight convolutional neural network mobilenet, and the auxiliary network uses a detection layer formed by a convolution kernel, an input of the auxiliary network being a feature map outputted by different convolutional layers of the basic network.

Specifically, the target detection model is constructed based on a deep learning neural network structure SSD. The core of the deep learning neural network structure SSD is to predict categories of a series of detection objects and regions in which the detection objects are located by using a convolution kernel. In addition, in the target detection model, the basic network in the deep learning neural network structure SSD is replaced with a lightweight convolutional neural network mobilenet. Because the convolutional neural network mobilenet has a higher processing speed, correspondingly, when target detection is performed by using the target detection model, candidate regions existing in the current video frame can also be detected quickly.

It is to be understood that the target detection model provided in this embodiment of this application may also be constructed based on other neural network structures, and the specific structure of the target detection model provided in this embodiment of this application is not limited herein.

Step 202. The server performs extraction according to a feature extraction model and the candidate regions, to obtain deep features corresponding to the candidate regions, the feature extraction model being an end-to-end neural network model that uses an image as an input and uses a deep feature of a movable body in the image as an output.

After the server detects all the candidate regions existing in the current video frame by using the target detection model, the server inputs all the candidate regions in the current video frame into a feature extraction model run on the server, and the feature extraction model correspondingly extracts deep features corresponding to the candidate regions. The deep feature can reflect the feature of the detection object in each candidate region from a deep level. The deep feature is robust to the deformation of an article, and does not simply change with the change of a feature such as a form of the detection object. In other words, even if the form of the detection object changes, the deep feature can still represent the detection object.

The feature extraction model is an end-to-end neural network model, uses an image as an input, and uses a deep feature of a movable body in the image as an output. That is, when feature extraction is performed on each candidate region in the current video frame by using the feature extraction model, the current video frame marked with the each candidate region is inputted into the feature extraction model, and the feature extraction model correspondingly extracts the deep feature of the each candidate region, and further outputs the deep feature of each movable body in the current video frame.

It is to be understood that, during target tracking, the tracking target is usually a movable body such as a person, an animal, or a vehicle, and an immovable body is not used as a tracking target under normal circumstances. Correspondingly, the feature extraction model does not need to output a deep feature of an immovable body. Therefore, the server does not need to subsequently perform a series of calculations based on the deep feature of the immovable body, which reduces the workload of the server to some extent.

Step 203. The server calculates feature similarities corresponding to the candidate regions according to the deep features corresponding to the candidate regions and a deep feature of a target detected in a previous video frame.

After the feature extraction model in the server obtains the deep feature corresponding to each candidate region, the server calculates the feature similarity corresponding to the each candidate region according to the deep feature corresponding to the each candidate region and the deep feature of the target detected in the previous video frame. The feature similarity corresponding to the each candidate region is the similarity between the deep feature of the each candidate region and the deep feature of the target detected in the previous video frame.

The foregoing previous video frame is a video frame that is closest to the current video frame and that has been tracked before the current video frame. For example, if the target is tracked in a previous video frame adjacent to the current video frame, the previous video frame adjacent to the current video frame is directly used as the foregoing previous video frame; if the target is not tracked in the previous video frame adjacent to the current video frame, according to a reverse chronological order, whether there is a tracking target in a video frame previous to the previous video frame continues to be determined, until a video frame in which the tracking target exists is found, and the found video frame is used as the foregoing previous video frame; and further, the feature similarity between the deep feature corresponding to each candidate region and the deep feature of the tracking target is calculated according to the deep feature of the target detected in the video frame and the deep feature corresponding to the each candidate region in the current video frame.

If the current video frame is the first video frame in the first video stream, the user may click a target in the first video frame. Correspondingly, the server may determine, in response to the click operation of the user, the target as a target needing to be tracked in the first video stream, extract a deep feature of the target by using a feature extraction model, and further perform target tracking in a subsequent video frame based on the deep feature of the target. In addition, the user may further upload an image including the target needing to the tracked to the server, so that the server extracts, by using a feature extraction model according to the uploaded image, the deep feature of the target needing to be tracked included in the image, and further performs target tracking in the first video stream based on the extracted deep feature of the target needing to be tracked.

It is to be understood that the server may also determine, in other manners, the target needing to be tracked, and performs target tracking in the first video stream based on the deep feature of the target. A specific manner of determining the tracking target is not limited herein.

When specifically calculating the feature similarity corresponding to each candidate region, the server may calculate, by using algorithms such as a Eucledian distance algorithm, a Manhattan distance algorithm, a Minkowski distance algorithm, and a cosine similarity algorithm, the similarity between a deep feature vector corresponding to each candidate region in the current video frame and a deep feature vector of the target detected in the previous video frame.

It is to be understood that, the server may also use other similarity calculation methods, to calculate the feature similarity corresponding to each candidate region according to the deep feature corresponding to the each candidate region and the deep feature of the target detected in the previous video frame. An algorithm used for calculating the feature similarity is not specifically limited herein.

Step 204. The server determines, according to the feature similarities corresponding to the candidate regions, the target detected in the current video frame.

After obtaining, through calculation, the feature similarity corresponding to the each candidate region in the current video frame, the server determines, based on the feature similarity corresponding to the each candidate region, the target needing to be tracked in the current video frame. Because a feature similarity corresponding to a candidate region can represent a similarity between a deep feature of the candidate region and the deep feature of the target detected in the previous video frame, a larger feature similarity indicates a larger similarity between a detection object in the candidate region and the target detected in the previous video frame, namely, a higher possibility that the detection object included in the candidate region is the target needing to be tracked in the current video frame.

When determining the tracking target in the current video frame, the server may select a candidate region with a highest feature similarity according to the feature similarities respectively corresponding to the candidate regions, as a target region of the current video frame; and further determine, according to the target region, the target detected in the current video frame.

Specifically, the server may first sort, according to the feature similarities corresponding to the candidate regions in the current video frame, the feature similarities corresponding to the candidate regions in the current video frame according to a size sequence. A larger feature similarity corresponding to a candidate region indicates a higher possibility that a detection object included in the candidate region is the target needing to the tracked. Therefore, a candidate region with a highest feature similarity may be selected therefrom as the target region of the current video frame according to a sorting order of the feature similarities, and the detection object included in the target region is further used as the target needing to be tracked in the current video frame.

Optionally, the server may first preset a threshold of the feature similarities. If a feature similarity of a candidate region exceeds the threshold, it indicates that the candidate region may be the target region, that is, a detection object included in the candidate region may be the target needing to be tracked in the current video frame. It is to be understood that, the threshold may be set according to actual situations, and the threshold is not specifically limited herein.

In some cases, there may be a plurality of candidate regions with feature similarities exceeding the threshold in the current video frame. In this case, each of the candidate regions may be the target region. For this case, this embodiment of this application provides the following three possible implementations, to determine the target region from the plurality of candidate regions with feature similarities exceeding the threshold, and further determine the tracking target based on the target region.

In a first possible implementation, the server may select, from the plurality of candidate regions with feature similarities exceeding the threshold, a candidate region most matching a motion direction of the target detected in the previous video frame, as a target region of the current video frame; and determine, according to the target region of the current video frame, the target detected in the previous video frame.

During specific implementation, the server may first determine, according to the feature similarities corresponding to the candidate regions in the current video frame, whether the feature similarities corresponding to the candidate regions exceed the threshold. If there are a plurality of candidate regions with feature similarities exceeding the threshold, the server determines the target region from the plurality of candidate regions according to the motion direction of the target detected in the previous video frame. Specifically, the server may input an image location of the target detected in a video frame previous to the current video frame into a location coordinate mapping model, determine, by using the location coordinate mapping model, a physical location of the target detected in the video frame previous to the current video frame, and then determine, according to the physical location of the target detected in the video frame previous to the current video frame, the motion direction of the target detected in the previous video frame; and according to the foregoing method, further determine, by using the location coordinate mapping model, physical locations of a plurality of candidate regions with feature similarities exceeding the threshold in the current video frame and a physical location of the target detected in the previous video frame, determine, according to the physical locations of the plurality of candidate regions with feature similarities exceeding the threshold and the physical location of the target detected in the previous video frame, motion directions respectively corresponding to the plurality of candidate regions with feature similarities exceeding the threshold in the current video frame, further calculate a degree of matching between the motion directions respectively corresponding to the plurality of candidate regions with feature similarities exceeding the threshold and the motion direction of the target detected in the previous video frame, and finally determine a candidate region most matching the motion direction of the target detected in the previous video frame, as the target region, and determine the tracking target in the current video frame based on the target region.

It is to be understood that, when the motion direction of the target detected in the previous video frame is determined, a plurality of consecutive video frames in which the target is detected and that are close to the previous video frame need to be selected, and the motion direction of the target is determined according to the locations of the target in the video frames.

To help understand a specific implementation of determining, according to the motion direction of the tracking target, the target region in a plurality of candidate regions with feature similarities exceeding the threshold, the following describes the specific implementation process of determining the target region by using examples.

It is assumed that the current video frame is the 20th video frame in the first video stream, and a video frame that is previous to and closest to the 20th video frame and that includes a detected target is the 19th video frame, namely, the previous video frame is the 19th video frame. The server determines a motion direction of the target detected in the 19th video frame according to physical locations of the target detected in the 17th video frame to the 19th video frame, as a first direction. Further, the server determines, according to physical locations of candidate regions with feature similarities exceeding the threshold in the 20th video frame and the physical location of the target detected in the 19th video frame, motion directions respectively corresponding to the candidate regions with feature similarities exceeding the threshold in the 20th video frame, as a second direction, namely, each candidate region with a feature similarity exceeding the threshold in the 20th video frame corresponds to one second direction, and the server calculates a degree of matching between each second direction and the first direction, finally determines a candidate region corresponding to a second direction with a highest matching degree as the target region, and determines, based on the target region, the target detected in the 20th video frame.

In a second possible implementation, the server may select, from the plurality of candidate regions with feature similarities exceeding the threshold, a candidate region with a smallest distance from a physical location of the target detected in the previous video frame, as a target region of the current video frame, and further determine, according to the target region of the current video frame, the target detected in the current video frame.

During specific implementation, the server may determine, according to image locations of the plurality of candidate regions with feature similarities exceeding the threshold in the current video frame, physical locations of the candidate regions; similarly, the server may determine, according to an image location of the target detected in the previous video frame in the video frame, the physical location of the target detected in the previous video frame, then calculate a distance between the physical location of each candidate region and the physical location of the target detected in the previous video frame, determine a candidate region with a smallest distance as the target region in the current video frame, and further use a detection object included in the target region of the current video frame as the target detected in the current video frame.

For example, it is assumed that the current video frame is the 20th frame in the first video stream, and a video frame that is closest to the current video frame and that includes a detected target is the 19th video frame. The server determines, according to image locations, in the 20th video frame, of two candidate regions with feature similarities exceeding the threshold in the 20th video frame, physical locations corresponding to the two candidate regions; the server determines, according to an image location of the target detected in the 19th video frame, a physical location of the target detected in the 19th video frame; the server calculates distances between physical locations corresponding to the two candidate regions and the physical location of the target detected in the 19th frame, determines a candidate region with a smallest distance as the target region, and uses a detection object included in the target region as the target detected in the 20th video frame.

In a third possible implementation, the server may select, with reference to two reference factors: a physical location distance and a detected motion direction, the target region in a plurality of candidate regions with feature similarities exceeding the threshold. To be specific, the server selects, from the plurality of candidate regions with feature similarities exceeding the threshold, a candidate region most matching a physical location and a motion direction of the target detected in the previous video frame, as the target region of the current video frame, that is, selects a candidate region that is closest to the target detected in the previous video frame and that has a motion direction most similar to that of the target detected in the previous video frame, and further determines, according to the target region of the current video frame, the target detected in the current video frame.

During specific implementation, the server may first convert, by using the location coordinate mapping model, the image locations of the candidate regions with feature similarities exceeding the threshold in the current video frame into physical locations, and convert the image location of the target detected in the previous video frame into a physical location; and then determine, based on the physical locations of the candidate regions with feature similarities exceeding the threshold and the physical location of the target detected in the previous video frame, a displacement corresponding to each candidate region with a feature similarity exceeding the threshold. The displacement is a directed line segment determined according to the physical location of the candidate region and the physical location of the target detected in the previous video frame. The directed line segment can not only represent a physical location distance between the candidate region and the target detected in the previous video frame, but also represent a motion direction corresponding to the candidate region. Similarly, the server may determine, according to a location of the target detected in a video frame that is adjacent to the previous video frame and that is previous to the previous video frame, and the location of the target detected in the previous video frame, a displacement corresponding to the target detected in the previous video frame. Further, a similarity between the displacement corresponding to each candidate region in the current video frame and the displacement corresponding to the target detected in the previous video frame is calculated, a candidate region with a highest similarity is selected, and the target detected in the current video frame is determined based on the target region. Optionally, the server may further determine, according to the method for determining the motion direction of the detected target provided in the first possible implementation, the motion direction of the target detected in the previous video frame, and further determine, according to locations of a plurality of candidate regions with feature similarities exceeding a threshold in the current video frame, a candidate region matching the motion direction of the detected target. If there is only one candidate region matching the motion direction of the detected target, the candidate region may be directly determined as the target region; if there are a plurality of candidate regions matching the motion direction of the detected target, the server continues to determine, according to the method for determining a physical location distance provided in the second possible implementation, physical location distances between the plurality of candidate regions matching the motion direction of the detected target and the target detected in the previous video frame, further selects a candidate region with a smallest physical location distance as the target region, and determines the tracking target in the current video frame based on the target region.

Optionally, the server may first determine, according to the method for determining a physical location distance provided in the second possible implementation, the physical location distances between the plurality of candidate regions with feature similarities exceeding the threshold in the current video frame and the target detected in the previous video frame, and further determine whether a physical location distance between each candidate region and the target detected in the previous video frame is less than a distance threshold. If there is only one candidate region with a physical location distance less than the distance threshold, the candidate region may be directly used as the target region. If there are a plurality of candidate regions with physical location distances less than the distance threshold, the server continues to determine, according to the method for determining the motion direction of the detected target provided in the first possible implementation, the motion direction of the target detected in the previous video frame, further selects, from the plurality of candidate regions with physical location distances less than the distance threshold, a candidate region most matching the motion direction of the target, as the target region, and further determines the tracking target in the current video frame based on the target region.

In the foregoing three possible implementations, when determining a physical location of a candidate region according to an image location of the candidate region, and when determining a physical location of the target detected in the previous video frame according to an image location of the target, the server may implement conversion between the image location and the physical location based on the location coordinate mapping model.

The server inputs the image location of the candidate region into the location coordinate mapping model, to obtain the physical location of the candidate region outputted by the location coordinate mapping model, and inputs the image location of the target detected in the previous video frame into the location coordinate mapping model, to obtain the physical location that is of the target detected in the previous video frame and that is outputted by the location coordinate mapping model.

During specific implementation, after the server inputs the image location of the candidate region into the location coordinate mapping model, the location coordinate mapping model performs corresponding processing on the image location of the candidate region, and further obtains and outputs the physical location corresponding to the candidate region. Similarly, after the server inputs the image location of the target detected in the previous video frame into the location coordinate mapping model, the location coordinate mapping model also performs corresponding processing on the image location of the target, and further obtains and outputs the physical location corresponding to the target.

It is to be understood that the image location is specifically pixel location coordinates of the candidate region or the tracking target in the video frame, and the physical location is specifically location coordinates of the candidate region or the tracking target in a planar map.

When the image location of the candidate region is determined, pixel location coordinates of an intersection between the candidate region and the ground may be used as the image location of the candidate region, or pixel location coordinates of a central point of the candidate region in the video frame may be used as the image location of the candidate region. The image location of the candidate region is not specifically limited herein. Similarly, when the image location of the tracking target is determined, pixel location coordinates of an intersection between the tracking target and the ground in the video frame in which the tracking target is located may be used as image coordinates of the tracking target, or pixel location coordinates of the central point of the tracking target in the video frame may be used as the image location of the tracking target. The image location of the tracking target is not specifically limited herein.

The location coordinate mapping model is constructed based on a coordinate mapping matrix. When specifically constructing the location coordinate mapping model, the server calculates, by using a perspective transformation formula, a coordinate mapping matrix according to location coordinates of at least four location points on a calibration image and physical location coordinates of the at least four location points on a physical world ground; and further generates the location coordinate mapping model according to the coordinate mapping matrix. Correspondingly, when the location coordinate mapping model is used, the location coordinate mapping model may obtain physical location coordinates corresponding to the image location coordinates by multiplying the inputted image location coordinates by the coordinate mapping matrix, that is, convert the image location in the video frame into the physical location in the physical world.

Different cameras may correspond to different coordinate mapping matrices. Therefore, each camera stores a coordinate mapping matrix corresponding to itself as its own attribute. When constructing the location coordinate mapping model, the server may construct, based on the coordinate mapping matrix corresponding to each camera, a location coordinate mapping model corresponding to the camera. Correspondingly, when the location coordinate mapping model is used for positioning an image location of a video frame, the location coordinate mapping model may retrieve a coordinate mapping matrix of a camera corresponding to the video frame, and convert an image location into a physical location by using the coordinate mapping matrix. It is to be understood that, the location coordinate mapping model may also be constructed by using an inverse matrix of the coordinate mapping matrix. A physical location in the physical world may be mapped as image location coordinates in the video frame by using the location coordinate mapping model. To be specific, bidirectional conversion between the image location and the physical location can be implemented by using the coordinate mapping matrix and the inverse matrix of the coordinate mapping matrix.

The location coordinate mapping model can convert the image location in the video frame into the physical location. Therefore, a motion trajectory of the target may also be drawn on a physical map by using the location coordinate mapping model according to the physical location of the target detected in the first video stream, so that the location of the detected target is positioned and displayed in real time on the physical map.

Specifically, the server may obtain, in a time sequence, video frames including a target in the first video stream, and then sequentially input image locations of the target included in the video frames into the location coordinate mapping model. Correspondingly, the location coordinate mapping model correspondingly outputs, according to the inputted image locations of the target, physical locations corresponding to the image locations of the target in the video frames, and further mark, according to a time sequence of the video frames, the physical locations corresponding to the target in the video frames on the physical map, so that the motion trajectory of the target can be drawn on the physical map according to the marked physical locations.

In the target tracking method provided in this embodiment of this application, target detection is performed in an overall range of the current video frame by using the target detection model, to determine all candidate regions existing in the current video frame, so as to determine a tracking target based on the determined candidate regions. As compared with the related art in which a target tracking range of a current video frame is determined according to a target region of a previous video frame, and target tracking is performed only in the target tracking range, in this embodiment of this application, the candidate regions are determined in the overall range of the video frame by using the target detection model, and the range of target tracking is enlarged, so that occurrence of a case of losing a tracking target due to excessively fast movement of the tracking target can be effectively prevented. In addition, in the target tracking method provided in this embodiment of this application, deep features of the determined candidate regions are extracted by using the feature extraction model, and the tracking target is determined based on the deep features of the candidate regions and the deep feature of the target detected in the previous video frame. As compared with the related art in which target tracking is performed only based on a morphological feature, in this embodiment of this application, the tracking target is determined based on the deep feature, so that it can be ensured that the determined tracking target is more accurate, and occurrence of a case of a tracking drift can be effectively prevented.

It is to be understood that, if the first video stream is shot by the first camera, with the motion of the tracking target, the target may move beyond a range that can be shot by the first camera, that is, the target disappears in a shooting range of the first camera, and the target cannot continue to be tracked in the first video stream shot by the first camera. In this case, according to the target tracking method provided in the embodiments of this application, a second camera that can shoot the target may also be selected from cameras adjacent to the first camera. Target tracking continues to be performed for a video stream shot by the second camera, that is, cross-screen target tracking is implemented.

Figure 4:
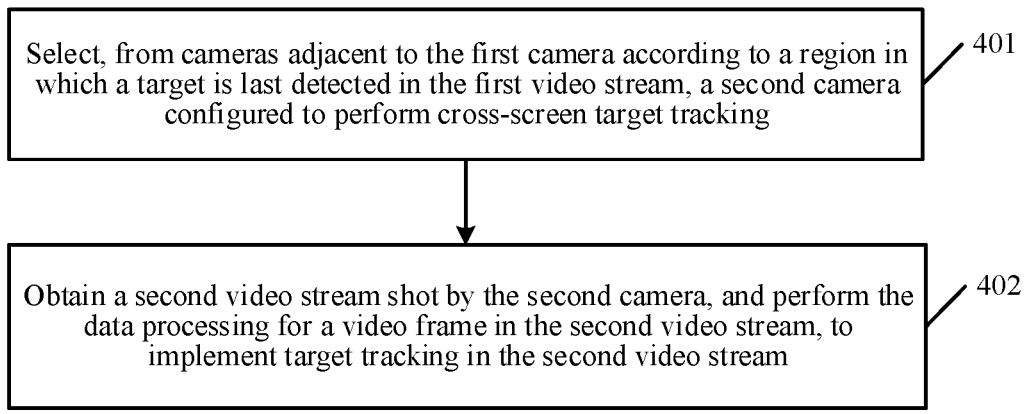
FIG. 4 is a schematic flowchart of a cross-screen target tracking method according to an embodiment of this application.

The following describes, with reference to FIG. 4, the cross-screen target tracking method provided in the embodiments of this application. FIG. 4 is a schematic flowchart of a cross-screen target tracking method according to an embodiment of this application. For ease of description, in this embodiment, description is made still by using a server as an execution body. It is to be understood that the execution body of the cross-screen target tracking method is not limited only to a server, but also may be applied to a device having an image processing function such as a terminal device. As shown in FIG. 4, the cross-screen target tracking method includes the following steps:

Step 401. The server selects, from cameras adjacent to the first camera according to a region in which a target is last detected in the first video stream, a second camera configured to perform cross-screen target tracking.

If the server cannot detect, a target needing to be tracked, in the first video stream within a preset time period, or, the server finds, through detection, that the target needing to be tracked disappears on an image edge that can be shot by the first camera, it indicates that the target needing to be tracked may move to a range that cannot be shot by the first camera. In this case, the server needs to select, from the cameras adjacent to the first camera according to a region in which the target is last detected in the first video stream, the second camera that can shoot the target needing to be tracked, to continue to perform target tracking in a second video stream shot by the second camera, that is, implement cross-screen tracking.

When selecting the second camera from the cameras adjacent to the first camera according to the region in which the target is last detected in the first video stream, for the cameras adjacent to the first camera, the server may first perform detection according to video streams shot by the cameras and a target detection model, to obtain candidate regions corresponding to the cameras.

During specific implementation, the server may first determine, according to the location of the first camera, cameras with locations adjacent to the location of the first camera, and then select, according to a moment at which the target is last detected in the first video stream, video frames from video streams shot by the cameras adjacent to the first camera. Shooting moments of the selected video frames are after the moment at which the target is last detected in the first video stream, and are within a time period adjacent to the moment at which the target is last detected. The adjacent time period may be set according to actual requirements.

It is to be understood that, in some cases, there may be distances between ranges that can be shot by the cameras adjacent to the first camera and the range that can be shot by the first camera, and the target needing to be tracked may fail to immediately move from the range that can be shot by the first camera to the range shot by the second camera. Therefore, when video streams are selected from the video streams shot by the cameras adjacent to the first camera, a plurality of video frames with shooting moments belonging to the adjacent time period may be selected from the video streams shot by the cameras adjacent to the first camera.

For ease of description, a video frame in which the target is last detected in the first video stream is referred to as a first video frame, and video frames selected from the video streams shot by the cameras adjacent to the first camera are collectively referred to as second video frames.

After selecting the second video frames from the video streams shot by the cameras adjacent to the first camera, the server inputs the second video frames into the target detection model. The target detection model performs corresponding processing on the second video frames, and performs detection to obtain candidate regions existing in the second video frames, that is, performs detection to obtain candidate regions corresponding to the cameras adjacent to the first camera.

After performing detection to obtain the candidate regions corresponding to the cameras adjacent to the first camera, the server selects, according to feature similarities between deep features corresponding to the candidate regions corresponding to the cameras and a deep feature of the target last detected in the first video stream, cameras corresponding to a plurality of candidate regions with feature similarities exceeding a threshold, as candidate cameras.

During specific implementation, the server extracts deep features of the candidate regions in the second video frames by using a feature extraction model, and calculates feature similarities between the deep features of the candidate regions in the second video frames and a deep feature of the target region in the first video frame, determines whether the feature similarities corresponding to the candidate regions exceed the threshold, and uses cameras corresponding to candidate regions with feature similarities exceeding the threshold as the candidate cameras. The second camera configured to perform cross-screen tracking is determined based on the deep features of the candidate regions and the deep feature of the target region in the first video frame, so that occurrence of a case of losing a target due to a change of a form of the target or a change of a shooting viewing angle of a camera can be effectively prevented. Even if in a cross-screen case, it can be ensured that the target is accurately tracked.

To help further understand the specific implementation process of determining the candidate cameras, the following describes the foregoing process of determining the candidate cameras by using examples.

It is assumed that the cameras adjacent to the first camera are a camera A, a camera B and a camera C, and second video frames with shooting moments adjacent to the shooting moment of the first video frame are respectively selected from video streams shot by the camera A, the camera B, and the camera C. It is assumed that the second video frame selected from the video stream shot by the camera A is a video frame a, the second video frame selected from the video stream shot by the camera B is a video frame b, and the second video frame selected from the video stream shot by the camera C is a video frame c. The server detects candidate regions existing in the video frame a, the video frame b, and the video frame c by using the target detection model. It is assumed that the target detection model detects that candidate regions a1, a2, a3, and a4 exist in the video frame a, candidate regions b1 and b2 exist in the video frame b, and a candidate region c1 exists in the video frame c.

Then, the server extracts deep features of the candidate regions existing in the video frame a, the video frame b, and the video frame c by using the feature extraction model, and calculates feature similarities between the deep features of the candidate regions in the video frame a, the video frame b, and the video frame c and the deep feature of the target region in the first video frame. Further, the server determines, according to the feature similarities corresponding to the candidate regions in the second video frames, candidate regions with feature similarities exceeding the threshold. Assuming that the candidate regions with feature similarities exceeding the threshold include the candidate region a3 and the candidate region c1, the server may use the camera A corresponding to the candidate region a3 and the camera C corresponding to the candidate region c1 as the candidate regions.

It is to be understood that, if there is only one candidate region with a feature similarity exceeding the threshold, a camera corresponding to the candidate region may be directly used as the second camera.

If a plurality of candidate cameras are determined according to the feature similarities corresponding to the candidate regions, the server may further select, from the candidate cameras, a camera corresponding to a candidate region most matching a physical location and a motion direction of the target last detected in the first video stream, as the second camera configured to perform target tracking.

During specific implementation, the server may input an image location of the target region in the first video frame into a location coordinate mapping model, determine a physical location of the target region in the first video frame by using the location coordinate mapping model, determine, according to image locations of candidate regions with feature similarities exceeding the threshold in the second video frames, physical locations of the candidate regions by using the location coordinate mapping model, and calculate distances between the physical locations of the candidate regions and the physical location of target region in the first video frame.

In addition, the server may further determine the motion direction of the tracking target according to a plurality of video frames that are adjacent to the first video frame in the first video stream and in which the target is detected, and further determine, according to locations of the candidate regions with feature similarities exceeding the threshold in the second video frames, whether the locations of the candidate regions with the feature similarities exceeding the threshold match the motion direction of the tracking target.

Finally, with reference to two factors, namely, the distances between the physical locations of the candidate regions and the physical location of the target region in the first video frame, and the motion direction of the target detected in the first video stream, a candidate region with a small physical location distance and that matches the motion direction of the target detected in the first video stream is determined, and a camera corresponding to the candidate region is used as the second camera configured to perform cross-screen target tracking.

It is to be understood that, the server may alternatively determine, only according to the distances between the physical locations of the candidate regions and the physical location of the target region in the first video frame, the second camera configured to perform target tracking, that is, the server may directly determine a candidate region with a smallest physical location distance from the target region in the first video frame, and further determine a camera corresponding to the candidate region as the second camera.

It is to be understood that, the server may alternatively determine, only according to the motion direction of the tracking target in the first video frame, a candidate region most matching the motion direction, and further determine a camera corresponding to the candidate region as the second camera.

In other words, when determining the second camera configured to perform cross-screen tracking, the server may determine, only according to the feature similarities of candidate regions in the second video frames, a camera corresponding to a candidate region with a highest feature similarity as the second camera. The server may alternatively determine, in the second video frames by combining the feature similarities, the physical location distances and/or the motion direction of the tracking target, a candidate region that most possibly includes the tracking target, and further determine a camera corresponding to the candidate region as a candidate camera.

Step 402. The server obtains a second video stream shot by the second camera, and performs the data processing for a video frame in the second video stream, to implement target tracking in the second video stream.

After determining the second camera, the server obtains the second video stream shot by the second camera, and performs the target tracking method shown in FIG. 2 for each video frame included in the second video stream, to implement target tracking in the second video stream.

It is to be understood that, when target tracking is performed in the second video stream, the server may alternatively convert the image location of the tracking target in each video frame in the second video stream into the physical location by using the location coordinate mapping model. Further, the server may draw a motion trajectory of the detected target on a physical map according to the physical locations of the target detected in the first video stream and the second video stream. That is, in a case of cross-screening tracking, the server may also draw the motion trajectory of the detected target on the physical map by using the location coordinate mapping model.

In the cross-screen tracking method provided in this embodiment of this application, candidate regions are detected by using the target detection model in video frames shot by the cameras adjacent to the first camera, and then deep features of the candidate regions are extracted by using the feature detection model, and feature similarities corresponding to the candidate regions are determined based on the deep features of the candidate regions and the deep feature of the target last detected in the first video stream; further, the second camera configured to perform cross-screen tracking is determined by combining the feature similarities corresponding to the candidate regions, the distances between the physical locations of the candidate regions and the physical location of the target last detected in the first video stream, and the motion direction of the target detected in the first video stream; and further, the target tracking method provided in the previous embodiment is performed for each video frame included in the second video stream shot by the second camera, to implement target tracking in the second video stream. In the foregoing cross-screen tracking process, the second camera configured to perform cross-screen tracking is determined by using the target detection model and the feature extraction model, and target tracking is performed in the second video stream shot by the second camera, so that it can be ensured that the second camera configured to perform cross-screen tracking can be accurately determined, and target tracking can be performed based on the deep feature of the tracking target in a large tracking range in the second video stream shot by the second camera, to ensure the accuracy of target tracking.

As described above, the target tracking method provided in the embodiments of this application needs to be implemented based on the feature extraction model, and deep features corresponding to the candidate regions are determined based on the candidate regions in the video frame. During actual applications, the target needing to be tracked is usually a human body. Therefore, the feature extraction model may be constructed based on a human body re-identification technology, so that the feature extraction model can correspondingly extract deep features of the human body.

Figure 5:
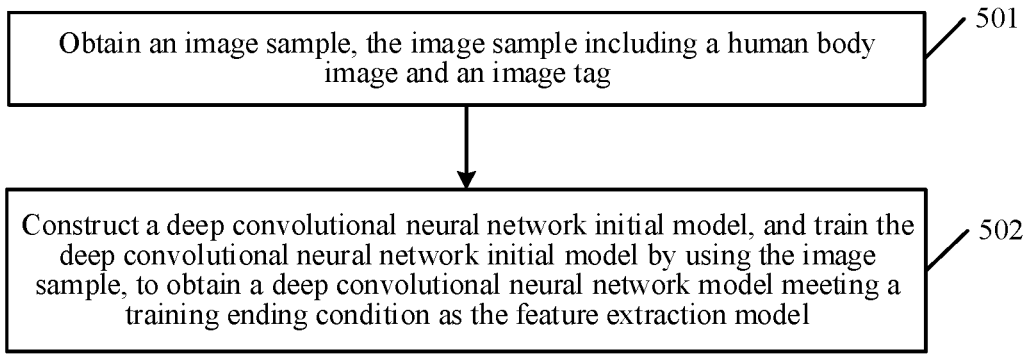
FIG. 5 is a schematic flowchart of a method for training a feature extraction model according to an embodiment of this application.

The following describes, with reference to the accompanying drawings, a method for training the feature extraction model used for extracting deep features of the human body. FIG. 5 is a schematic flowchart of a method for training a feature extraction model according to an embodiment of this application. For ease of description, in this embodiment, description is made still by using a server as an execution body. It is to be understood that the execution body of the training method is not limited only to a server, but also may be applied to a device having a model training function such as a terminal device. As shown in FIG. 5, the training method includes the following steps:

Step 501. The server obtains an image sample, the image sample including a human body image and an image tag.

When training a feature extraction model, the server needs to obtain the image sample, to facilitate training the feature extraction model based on the obtained image sample. The image sample obtained by the server usually includes a human body image and an image tag corresponding to the human body image. The human body image is an image including a person, and the image tag is a tag that can represent the person in the human body image. For example, the human body image obtained by the server is an image including a person A, and the image tag corresponding to the human body image is a tag that can represent that the person A exists in the human body image.

It is to be understood that a large quantity of image samples usually need to be obtained when the feature extraction model is trained, so that a feature extraction model with good performance can be trained based on the image samples.

To enrich the image samples used for training the feature extraction model, the server may further perform multi-pose augmentation on the human body images in the obtained image samples by using a generative adversarial network constructed based on a human body pose recognition technology, to generate more human body images for the same person, thereby enriching the image samples.

Step 502. The server constructs a deep convolutional neural network initial model, and trains the deep convolutional neural network initial model by using the image sample, to obtain a deep convolutional neural network model meeting a training ending condition as the feature extraction model.

When the feature extraction model is trained, the deep convolutional neural network initial model may be constructed based on a human body partial segmentation technology and a feature learning technology; human body deep features may be extracted from human body images included in the image samples by using the deep convolutional neural network initial model. Further, a loss function is constructed based on feature errors of human body deep features respectively corresponding to human body images having the same tag, optimization training is performed on the deep convolutional neural network initial model based on the loss function, to obtain, through training, a parameter of the model meeting the training ending condition, and the deep convolutional neural network model finally obtained through training is used as the feature extraction model.

When determining whether the trained model meets the training ending condition, the server may verify the trained model by using a test image sample. The trained model is a model obtained after one or more rounds of training and optimization are performed on the deep convolutional neural network initial model by using the image sample. The test image sample may include a plurality of test human body images corresponding to the same test image tag, or may include a plurality of test human body images corresponding to different test image tags. Specifically, when the trained model is verified by using the plurality of test human body images corresponding to the same test image tag, the plurality of test human body images included in the test image sample may be inputted into the first model, and human body deep features of the test human body images are extracted by using the trained model. If a feature similarity between the human body deep features corresponding to the test human body images exceeds a first similarity threshold, it indicates that the first model has good model performance, and has met the training ending condition, and the trained model may be directly used as the feature extraction model. If the first model is verified by using the plurality of test human body images corresponding to the different test image tags, the plurality of test human body images included in the test image sample may be inputted into the trained model, and human body deep features of the test human body images are extracted by using the trained model. If a feature similarity between the human body deep features corresponding to the test human body images is lower than a second similarity threshold, it indicates that the first model has good model performance, and has met the training ending condition, and the trained model may be directly used as the feature extraction model. Otherwise, it indicates that performance of the trained model is not sufficiently good, and further training is required.

It is to be understood that the first similarity threshold is greater than the second similarity threshold, and the first similarity threshold and the second similarity threshold may be set according to actual situations. The first similarity threshold and the second similarity threshold are not specifically limited herein.

To help understand the specific implementation process of determining whether the trained model meets the training ending condition, the following describes the foregoing determining process by using examples.

It is assumed that the server verifies, by using a test image sample A, the deep convolutional neural network initial model obtained through the first round of training and optimization, the test image sample A including a test human body image a1 and a test human body image a2 that correspond to the same test image tag. After the server inputs the test human body image a1 and the test human body image a2 into the training model obtained through the first round of training and optimization, the model correspondingly extracts a human body deep feature in the test human body image a1 and a human body deep feature of the test human body image a2, and calculates a feature similarity between the human body deep feature in the test human body image a1 and the human body deep feature in the test human body image a2; if the feature similarity is greater than the first similarity threshold, it indicates that the model recognition accuracy has reached the goal, and in this case, the trained model has met the training ending condition, and the model may be used as the feature extraction model; otherwise, if the feature similarity is less than the first similarity threshold, it indicates that the recognition accuracy of the trained model cannot meet the requirement, and the trained model has not met the training ending condition, and the image sample needs to be used to continue to perform training and optimization on the model.

It is to be understood that, during actual applications, the server may also verify, in other manners, whether the deep convolutional neural network initial model meets the training ending condition, and the verification on the deep convolutional neural network initial model is not limited herein.

The feature extraction model is constructed and trained according to the foregoing method based on the human body re-identification technology, so that it can be ensured that the feature extraction model obtained through training can accurately extract the deep feature of the human body. Therefore, when target tracking is performed based on the feature extraction model, it is ensured that the deep feature of the target needing to be tracked and the deep features of the candidate regions determined by the target detection model can be accurately determined, thereby ensuring the accuracy of target tracking.

To help further understand the target tracking method provided in the embodiments of this application, the following describes a target tracking method provided in the embodiments of this application with reference to an application scenario in which the target is tracked in a surveillance video.

Figure 6:
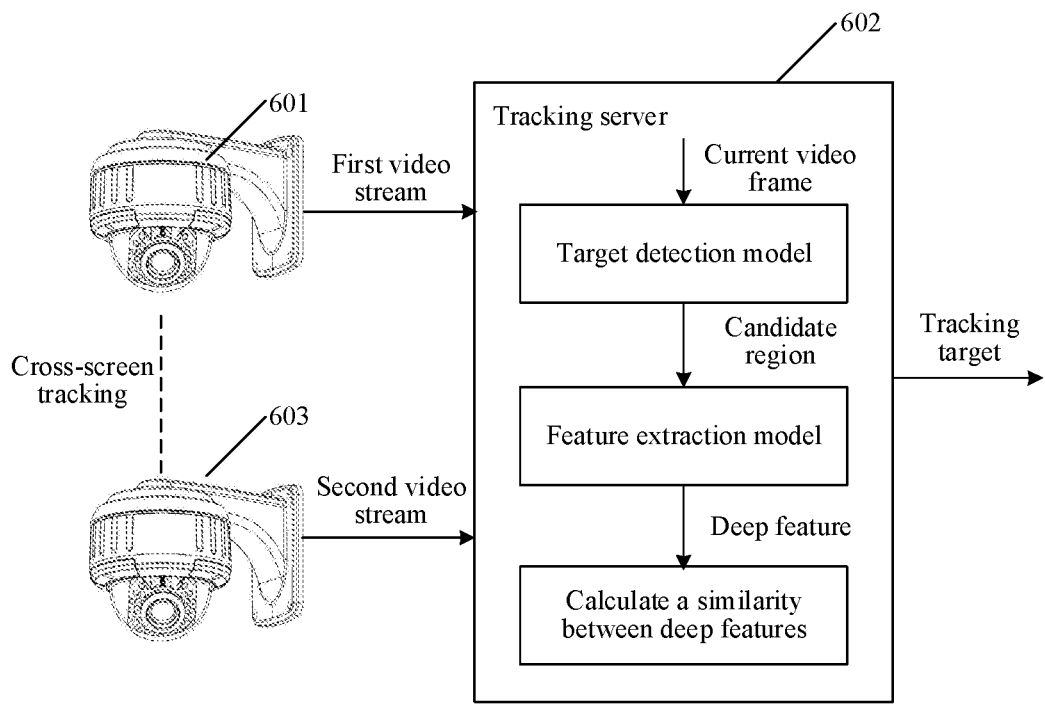
FIG. 6 is a schematic diagram of an application scenario of another target tracking method according to an embodiment of this application.

FIG. 6 is a schematic diagram of an application scenario of a target tracking method according to an embodiment of this application. The application scenario includes a first camera 601, a tracking server 602, and a second camera 603.

When a security guard needs to perform target tracking in a first video stream shot in real time by the first camera 601, the security guard may initiate a corresponding target tracking request to the tracking server 602 by using a terminal device. Correspondingly, in response to the target tracking request, the tracking server 602 obtains, in real time from the first camera 601, the first video stream shot by the first camera 601, and performs the following data processing on a video frame in the first video stream.

When specifically performing target tracking for a video frame in the first video stream, the tracking server 602 uses the video frame as a current video stream. The tracking server 602 first detects a detection object in an overall range of the current video frame by using a target detection model, to obtain all candidate regions existing in the current video frame, each candidate region including one detection object. Then, the tracking server 602 extracts deep features of the candidate regions in the current video frame by using a feature extraction model. Further, the tracking server 602 calculates, according to the deep features corresponding to the candidate regions and a deep feature of a target detected in a video frame previous to the current video frame, feature similarities between the deep features corresponding to the candidate regions and the deep feature of the target detected in the previous video frame, and finally, determines, based on the feature similarities corresponding to the candidate regions, the target detected in the current video frame.

When determining the target detected in the current video frame, the tracking server 602 may alternatively determine, by using a location coordinate mapping model, physical locations corresponding to the candidate regions in the current video frame and a physical location of the target detected in the previous video frame, and calculate, based on the physical locations of the candidate regions and the physical location of the target detected in the previous video frame, distances between the physical locations of the candidate regions and the physical location of the target detected in the previous video frame; and further determine, with reference to two factors, that is, the feature similarities and the physical location distances, the target detected in the current video frame.

When determining the target detected in the current video frame, the tracking server 602 may alternatively determine, according to a location of the target detected in the previous video frame, a motion direction of the detected target, and determine, according to locations of the candidate regions in the current video frame, whether the candidate regions match the motion direction of the detected target; and further determine, with reference to two factors, that is, the feature similarities and a degree of matching between the candidate regions and the motion direction of the detected target, the target detected in the current video frame.

In addition, when determining the target detected in the current video frame, the tracking server 602 may alternatively determine the target detected in the current video frame by combining the three factors, that is, the feature similarities, the physical location distances, the degree of matching with the motion direction.

Therefore, the tracking server 602 may perform data processing on each video frame in the first video stream according to the foregoing method, to implement target tracking in the first video stream.

If the tracking server 602 finds, through detection, that the tracking target disappears on an edge of a range that can be shot by the first camera, and the target is not detected within a preset time period in the first video stream shot by the first camera, it may be considered that the tracking target moves to a range that cannot be shot by the first camera. Correspondingly, the tracking server 602 enables cross-screen target tracking, to determine a second camera 603 that can shoot the target needing to the tracked.

When determining the second camera 603, the tracking server 602 first needs to determine cameras adjacent to the first camera 601 according to a location of the first camera 601; and further extract, according to a moment at which the first camera 601 last shoots the target needing to be tracked, second video frames from video streams shot by the cameras adjacent to the first camera 601, and detect candidate regions existing in the second video frames by using the target detection model.

Then, the tracking server 602 extracts deep features of the candidate regions in the second video frames by using the feature extraction model, and calculates, according to the deep features of the candidate regions and the deep feature of the target last detected in the first video stream, feature similarities corresponding to the candidate regions; and further selects candidate regions with feature similarities exceeding a threshold, and determines cameras corresponding to the candidate regions with feature similarities exceeding the threshold as candidate cameras.

When there is only one candidate region with a feature similarity exceeding the threshold, the tracking server 602 may directly use a camera corresponding to the candidate region as the second camera. When there are a plurality of candidate regions with feature similarities exceeding the threshold, the tracking server 602 may determine physical locations of the candidate regions with feature similarities exceeding the threshold by using the location coordinate mapping model, and further determine, according to the physical locations of the candidate regions and the physical location of the target last detected in the first video stream, physical location distances between the candidate regions and the target last detected in the first video stream. In addition, the tracking server 602 may further determine a motion direction of the target last detected in the first video stream, and determine whether locations of the candidate regions with feature similarities exceeding the threshold match the motion direction of the target. Finally, the tracking server 602 selects, from the candidate regions with feature similarities exceeding the threshold, a candidate region that has a smallest physical location distance and that most matches the motion direction of the target, and determines a camera corresponding to the candidate region as the second camera 603.

Further, the tracking server 602 may perform, according to the foregoing method for performing target tracking in the first video stream shot by the first camera 601, target tracking on a second video stream shot by the second camera 602.

The location coordinate mapping model can convert an image location of a target detected in a video frame into a physical location. Therefore, the tracking server 602 may further convert image locations of the target detected in the video frames in the first video stream and the second video stream into physical locations on a physical map by using the location coordinate mapping model, and draw a motion trajectory of the target on the physical map according to the physical locations of the target detected in the video frames. In this way, a security guard updates the displayed motion trajectory in real time according to the physical map, and timely and properly arrange security protection power to track and intercept the target, and also provides quick and powerful help for investigating and backtracking the crime commitment trajectory of a historical malicious person.

During actual applications, a video surveillance system usually includes a plurality of cameras, and all-around surveillance is performed through the plurality of cameras. In the scenario shown in FIG. 6, the implementation process of the solution is described only by using cross-screen tracking of two cameras, and when target tracking is performed based on a plurality of cameras, the essence is repeated implementation of the foregoing target tracking method.

For the target tracking methods described above, the embodiments of this application further provide corresponding target tracking apparatuses, to help application and implementation of the methods in practice.

Figure 7:
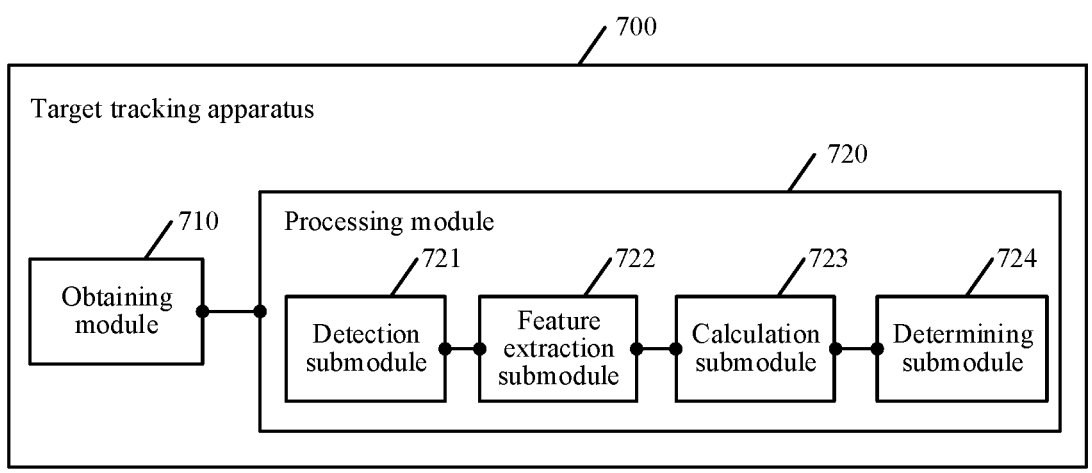
FIG. 7 is a schematic structural diagram of a target tracking apparatus according to an embodiment of this application.

FIG. 7 is a schematic structural diagram of a target tracking apparatus corresponding to the method shown in FIG. 2. The target tracking apparatus 700 includes one or more processors and one or more memories storing program units, the program units being executed by the processors, and the program units including:

an obtaining module 710, configured to obtain a first video stream; and a processing module 720, configured to perform the following data processing for a video frame in the first video stream, to implement target tracking in the first video stream, the processing module 720 including:

a detection submodule 721, configured to perform detection according to a target detection model and a current video frame, to obtain candidate regions in the current video frame;

a feature extraction submodule 722, configured to perform extraction according to a feature extraction model and the candidate regions, to obtain deep features corresponding to the candidate regions, the feature extraction model being an end-to-end neural network model that uses an image as an input and uses a deep feature of a movable body in the image as an output;

a calculation submodule 723, configured to calculate feature similarities corresponding to the candidate regions according to the deep features corresponding to the candidate regions and a deep feature of a target detected in a previous video frame; and a determining submodule 724, configured to determine, according to the feature similarities corresponding to the candidate regions, the target detected in the current video frame.

Optionally, based on the target tracking apparatus shown in FIG. 7, the determining submodule 724 is specifically configured to:

select a candidate region with a highest feature similarity according to the feature similarities respectively corresponding to the candidate regions, as a target region of the current video frame; and determine, according to the target region, the target detected in the current video frame.

Optionally, based on the target tracking apparatus shown in FIG. 7, the determining submodule 724 is specifically configured to:

select a plurality of candidate regions with feature similarities exceeding a threshold according to the feature similarities respectively corresponding to the candidate regions;

select, from the plurality of candidate regions, a candidate region most matching a motion direction of the target detected in the previous video frame, as a target region of the current video frame; and determine, according to the target region of the current video frame, the target detected in the current video frame.

Optionally, based on the target tracking apparatus shown in FIG. 7, the determining submodule 724 is specifically configured to:

select a plurality of candidate regions with feature similarities exceeding a threshold according to the feature similarities respectively corresponding to the candidate regions;

select, from the plurality of candidate regions, a candidate region with a smallest distance from a physical location of the target detected in the previous video frame, as a target region of the current video frame; and determine, according to the target region of the current video frame, the target detected in the current video frame.

Optionally, based on the target tracking apparatus shown in FIG. 7, the determining submodule 724 is specifically configured to:

select a plurality of candidate regions with feature similarities exceeding a threshold according to the feature similarities respectively corresponding to the candidate regions;

select, from the plurality of candidate regions, a candidate region most matching a physical location and a motion direction of the target detected in the previous video frame, as a target region of the current video frame; and determine, according to the target region of the current video frame, the target detected in the current video frame.

Optionally, based on the target tracking apparatus shown in FIG. 7, the determining submodule 724 specifically calculates, in the following manner, a physical location of a candidate region and the physical location of the target detected in the previous current video frame:

inputting an image location of the candidate region into a location coordinate mapping model, and obtaining the physical location of the candidate region outputted by the location coordinate mapping model; and inputting an image location of the target detected in the previous video frame into the location coordinate mapping model, and obtaining the physical location that is of the target detected in the previous video frame and that is outputted by the location coordinate mapping model.

Figure 8:
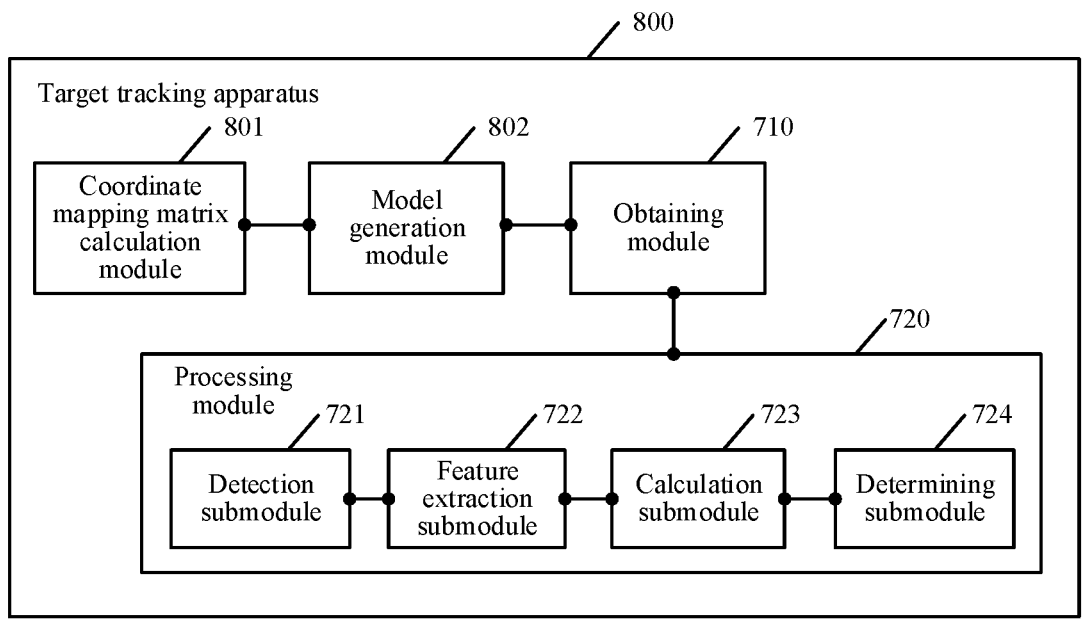
FIG. 8 is a schematic structural diagram of another target tracking apparatus according to an embodiment of the present application.

Optionally, based on the target tracking apparatus shown in FIG. 8, FIG. 8 is a schematic structural diagram of another target tracking apparatus according to an embodiment of this application. The apparatus 800 further includes one or more processors and one or more memories storing program units, the program units being executed by the processors, and the program units including:

a coordinate mapping matrix calculation module 801, configured to calculate, by using a perspective transformation formula, a coordinate mapping matrix according to location coordinates of at least four location points on a preset calibration image and physical location coordinates of the at least four location points on a physical world ground; and a model generation module 802, configured to generate the location coordinate mapping model according to the coordinate mapping matrix.

Figure 9:
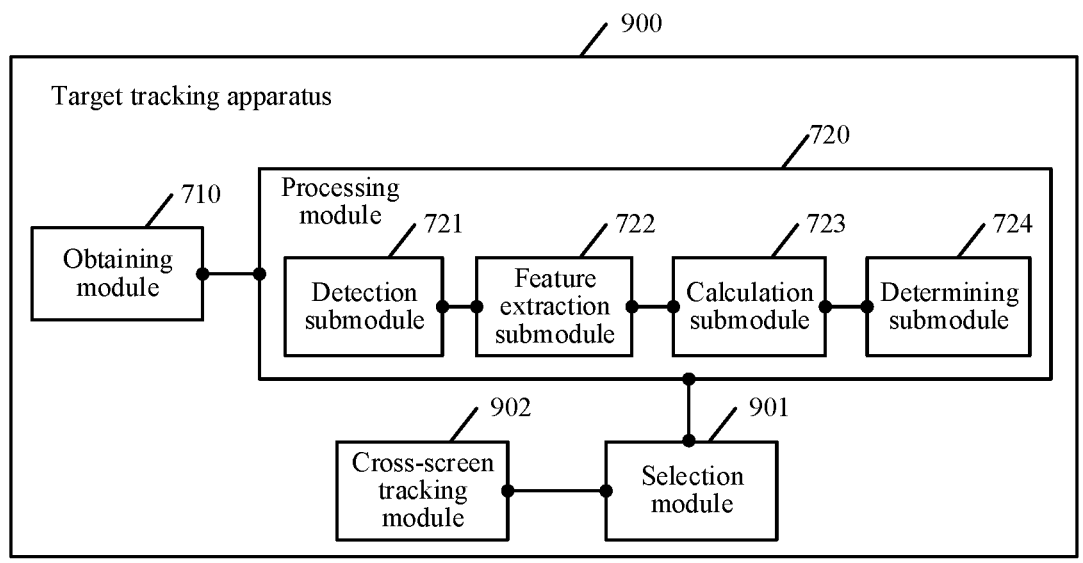
FIG. 9 is a schematic structural diagram of another target tracking apparatus according to an embodiment of the present application.

Optionally, based on the target tracking apparatus shown in FIG. 7, FIG. 9 is a schematic structural diagram of another target tracking apparatus according to an embodiment of this application. The apparatus 900 further includes one or more processors and one or more memories storing program units, the program units being executed by the processors, and the program units including:

a selection module 901, configured to select, from cameras adjacent to a first camera according to a region in which the target is last detected in the first video stream, a second camera configured to perform cross-screen target tracking, the first video stream being shot by the first camera;

a cross-screen tracking module 902, configured to obtain a second video stream shot by the second camera, and perform the data processing for a video frame in the second video stream, to implement target tracking in the second video stream.

Optionally, based on the target tracking apparatus shown in FIG. 9, the selection module 901 is specifically configured to:

for the cameras adjacent to the first camera, perform detection according to video streams shot by the cameras and a target detection model, to obtain candidate regions corresponding to the cameras;

select, according to feature similarities between deep features corresponding to the candidate regions corresponding to the cameras and a deep feature of the target last detected in the first video stream, cameras corresponding to a plurality of candidate regions with feature similarities exceeding a threshold, as candidate cameras; and select, from the candidate cameras, a camera corresponding to a candidate region most matching a physical location and a motion direction of the target last detected in the first video stream, as the second camera configured to perform target tracking.

Figure 10:
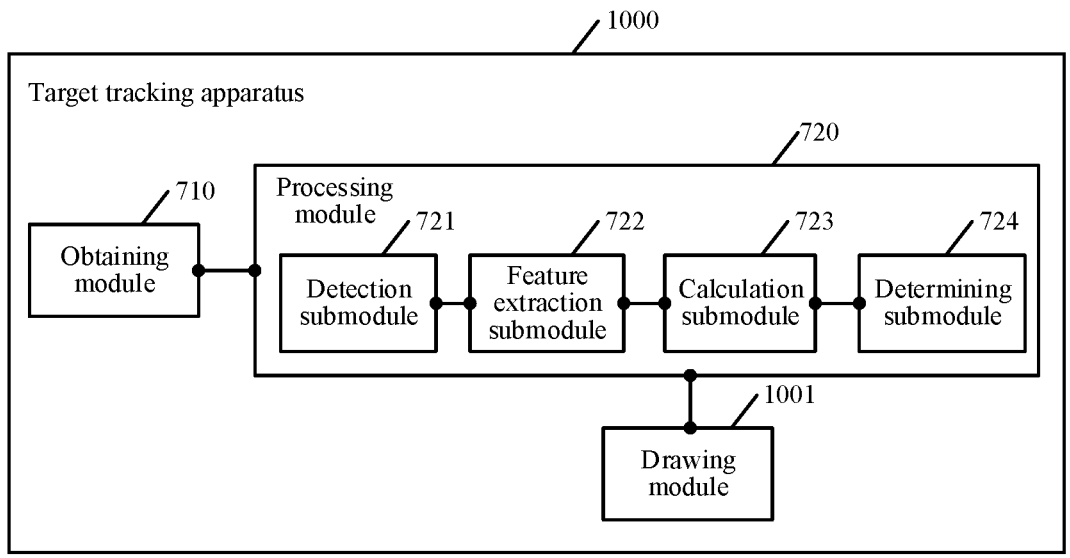
FIG. 10 is a schematic structural diagram of another target tracking apparatus according to an embodiment of the present application.

Optionally, based on the target tracking apparatus shown in FIG. 7, FIG. 10 is a schematic structural diagram of another target tracking apparatus according to an embodiment of this application. The apparatus 1000 further includes one or more processors and one or more memories storing program units, the program units being executed by the processors, and the program units including:

a drawing module 1001, configured to draw, according to a physical location of the target detected in the first video stream, a motion trajectory of the target on a physical map.

Optionally, based on the target tracking apparatus shown in FIG. 7, the target detection model includes:

a basic network and an auxiliary network, where the basic network uses a lightweight convolutional neural network mobilenet, and the auxiliary network uses a detection layer formed by a convolution kernel, an input of the auxiliary network being a feature map outputted by different convolutional layers of the basic network.

Figure 11:
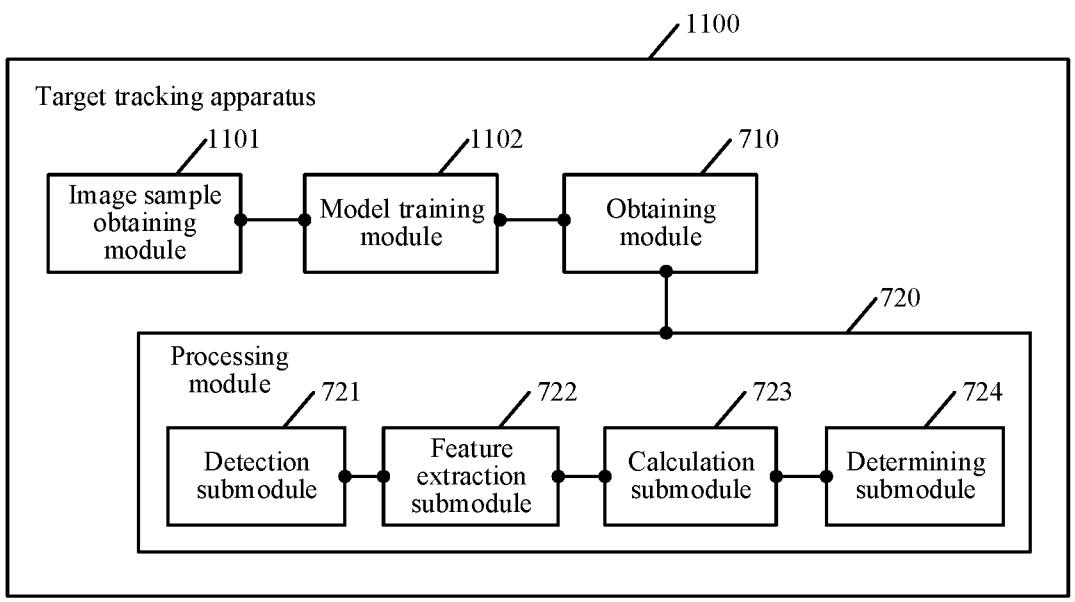
FIG. 11 is a schematic structural diagram of another target tracking apparatus according to an embodiment of the present application.

Optionally, based on the target tracking apparatus shown in FIG. 7, FIG. 11 is a schematic structural diagram of another target tracking apparatus according to an embodiment of this application. The apparatus 1100 further includes one or more processors and one or more memories storing program units, the program units being executed by the processors, and the program units including:

an image sample obtaining module 1101, configured to obtain an image sample, the image sampling including a human body image and an image tag; and a model training module 1102, configured to construct a deep convolutional neural network initial model, and train the deep convolutional neural network initial model by using the image sample, to obtain a deep convolutional neural network model meeting a training ending condition as the feature extraction model.

In the target tracking apparatus provided in this embodiment of this application, target detection is performed in an overall range of the current video frame by using the target detection model, to determine all candidate regions existing in the current video frame, so as to determine a tracking target based on the determined candidate regions. As compared with the related art in which a target tracking range of a current video frame is determined according to a target region of a previous video frame, and target tracking is performed only in the target tracking range, in this embodiment of this application, the candidate regions are determined in the overall range of the video frame by using the target detection model, and the range of target tracking is enlarged, so that occurrence of a case of losing a tracking target due to excessively fast movement of the tracking target can be effectively prevented. In addition, in the target tracking apparatus provided in this embodiment of this application, deep features of the determined candidate regions are extracted by using the feature extraction model, and the tracking target is determined based on the deep features of the candidate regions and the deep feature of the target detected in the previous video frame. As compared with the related art in which target tracking is performed only based on a morphological feature, in this embodiment of this application, the tracking target is determined based on the deep feature, so that it can be ensured that the determined tracking target is more accurate, and occurrence of a case of a tracking drift can be effectively prevented. In addition, the target tracking apparatus provided in this embodiment of this application may also be reliably applied to a scenario of cross-screen target tracking. Therefore, in the application scenario of cross-screen target tracking, occurrence of a case of losing a tracking target or a tracking target drift can also be effectively prevented, to ensure the accuracy of target tracking.

Figure 12:
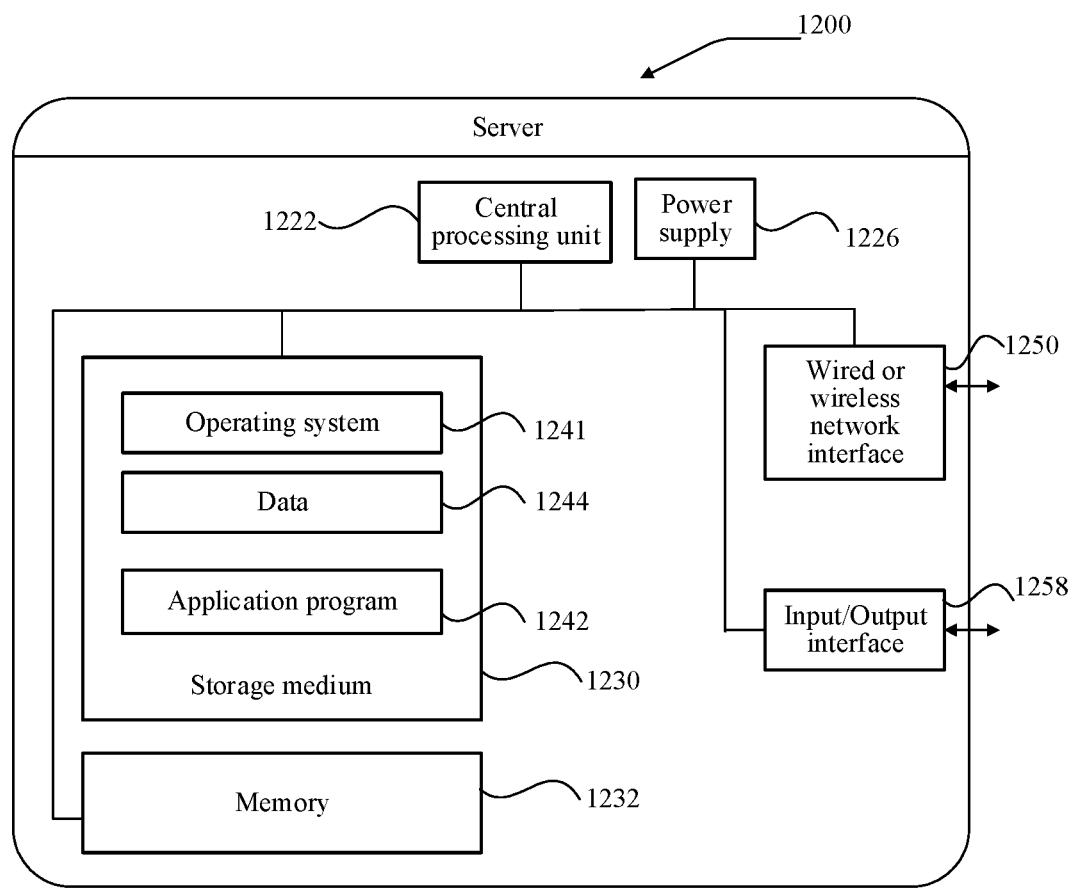
FIG. 12 is a schematic structural diagram of a target tracking device according to an embodiment of this application.

An embodiment of this application further provides a target tracking device. The device may be specifically a server. FIG. 12 is a schematic structural diagram of a target tracking device according to an embodiment of this application. The server 1200 may vary greatly due to different configurations or performance, and may include one or more central processing units (CPU) 1222 (for example, one or more processors) and a memory 1232, and one or more storage media 1230 (for example, one or more mass storage devices) that store an application 1242 or data 1244. The memory 1232 and the storage medium 1230 may be used for transient storage or permanent storage. A program stored in the storage medium 1230 may include one or more modules (which are not marked in the figure), and each module may include a series of instruction operations on the server. Further, the CPU 1222 may be set to communicate with the storage medium 1230, and perform, on the server 1200, the series of instruction operations in the storage medium 1230. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The server 1200 may further include one or more power supplies 1226, one or more wired or wireless network interfaces 1250, one or more input/output interfaces 1258, and/or one or more operating systems 1241 such as Windows Server™, Mac OS X™, Unix™, Linux™, or FreeBSD™.

The steps performed by the server in the foregoing embodiment may be based on the server structure shown in FIG. 12.

The CPU 1222 is configured to perform the following steps:

obtaining a first video stream, and performing the following data processing for a video frame in the first video stream, to implement target tracking in the first video stream, the data processing including:

performing detection according to a target detection model and a current video frame, to obtain candidate regions in the current video frame;

performing extraction according to the feature extraction model and the candidate regions, to obtain deep features corresponding to the candidate regions, the feature extraction model being an end-to-end neural network model that uses an image as an input and uses a deep feature of a movable body in the image as an output;

calculating feature similarities corresponding to the candidate regions according to the deep features corresponding to the candidate regions and a deep feature of a target detected in a previous video frame; and determining, according to the feature similarities corresponding to the candidate regions, the target detected in the current video frame.

Optionally, the CPU 1222 may further perform method steps of any specific implementation of the target tracking method in the embodiments of this application.

Figure 13:
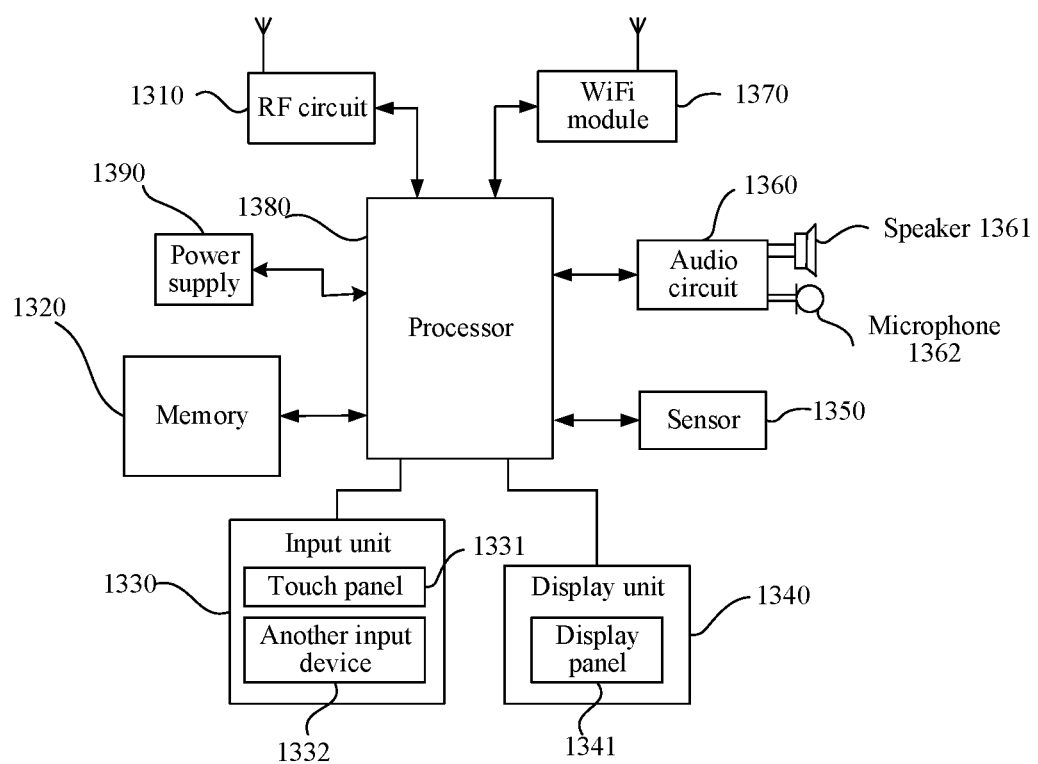
FIG. 13 is a schematic structural diagram of another target tracking device according to an embodiment of this application.

An embodiment of this application further provides another target tracking device, which may be a terminal device. As shown in FIG. 13, for ease of description, only parts related to the embodiments of this application are shown. For specific technical details that are not disclosed, refer to the method part in the embodiments of this application. The terminal may be any terminal device such as a mobile phone, a tablet computer, a personal digital assistant (PDA for short), a point of sales (POS for short), or an in-vehicle computer. An example in which the terminal is a mobile phone is used.

FIG. 13 is a block diagram of a partial structure of a mobile phone related to a terminal according to an embodiment of this application. Referring to FIG. 13, the mobile phone includes: components such as a radio frequency (RF for short) circuit 1310, a memory 1320, an input unit 1330, a display unit 1340, a sensor 1350, an audio circuit 1360, a wireless fidelity (Wi-Fi for short) module 1370, a processor 1380, and a power supply 1390. A person skilled in the art may understand that the structure of the mobile phone shown in FIG. 13 does not constitute a limitation to the mobile phone, and the mobile phone may include more components or fewer components than those shown in the figure, or some components may be combined, or a different component deployment may be used.

The components of the mobile phone are described in detail below with reference to FIG. 13:

The RF circuit 1310 may be configured to receive and transmit signals during an information receiving and transmitting process or a call process. Specifically, the RF circuit receives downlink information from a base station, then delivers the downlink information to the processor 1380 for processing, and transmits designed uplink data to the base station. Generally, the RF circuit 1310 includes, but is not limited to, an antenna, at least one amplifier, a transceiver, a coupler, a low noise amplifier (LNA for short), a duplexer, and the like. In addition, the RF circuit 1310 may also communicate with a network and another device through wireless communication. The wireless communication may use any communication standard or protocol, which includes, but is not limited to, Global System for Mobile communications (GSM for short), General Packet Radio Service (GPRS), Code Division Multiple Access (CDMA for short), Wideband Code Division Multiple Access (WCDMA for short), Long Term Evolution (LTE for short), email, Short Messaging Service (SMS), and the like.

The memory 1320 may be configured to store a software program and module. The processor 1380 runs the software program and module stored in the memory 1320, to implement various functional applications and data processing of the mobile phone. The memory 1320 may mainly include a program storage area and a data storage area. The program storage area may store an operating system, an application program required for at least one function (such as an audio playing function and an image playing function), and the like. The data storage area may store data (such as audio data and a phone book) created according to use of the mobile phone. In addition, the memory 1320 may include a high speed random access memory, and may further include a non-volatile memory, such as at least one magnetic disk storage device, a flash memory device, or another non-volatile solid-state storage device.

The input unit 1330 may be configured to receive inputted digital or character information, and generate a key signal input related to user setting and function control of the mobile phone. Specifically, the input unit 1330 may include a touch panel 1331 and another input device 1332. The touch panel 1331, also referred to as a touchscreen, may collect a touch operation performed by a user on or near the touch panel (such as an operation performed by a user on the touch panel 1331 or near the touch panel 1331 by using any proper article or accessory, such as a finger or a stylus), and drive a corresponding connecting device according to a preset program. Optionally, the touch panel 1331 may include two parts: a touch detection apparatus and a touch controller. The touch detection apparatus detects a touch position of a user, detects a signal generated by the touch operation, and transfers the signal to the touch controller. The touch controller receives the touch information from the touch detection apparatus, converts the touch information into touch point coordinates, and transmits the touch point coordinates to the processor 1380. Moreover, the touch controller can receive and execute a command sent from the processor 1380. In addition, the touch panel 1331 may be a touch panel of a resistive, capacitive, infrared, or surface acoustic wave type. In addition to the touch panel 1331, the input unit 1330 may further include another input device 1332. Specifically, the another input device 1332 may include, but is not limited to, one or more of a physical keyboard, a function key (such as a volume control key or a power on/off key), a trackball, a mouse, a joystick, or the like.

The display unit 1340 may be configured to display information inputted by the user or information provided for the user, and various menus of the mobile phone. The display unit 1340 may include a display panel 1341. Optionally, the display panel 1341 may be configured by using a liquid crystal display (LCD for short), an organic light-emitting diode (OLED for short), or the like. Further, the touch panel 1331 may cover the display panel 1341. After detecting a touch operation on or near the touch panel 1331, the touch panel 1331 transfers the touch operation to the processor 1380, to determine the type of the touch event. Then, the processor 1380 provides corresponding visual output on the display panel 1341 according to the type of the touch event. Although in FIG. 13, the touch panel 1331 and the display panel 1341 are used as two separate parts to implement input and output functions of the mobile phone, in some embodiments, the touch panel 1331 and the display panel 1341 may be integrated to implement the input and output functions of the mobile phone.

The mobile phone may further include at least one sensor 1350 such as an optical sensor, a motion sensor, and other sensors. Specifically, the optical sensor may include an ambient light sensor and a proximity sensor. The ambient light sensor may adjust luminance of the display panel 1341 according to brightness of the ambient light. The proximity sensor may switch off the display panel 1341 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1360, a speaker 1361, and a microphone 1362 may provide audio interfaces between a user and the mobile phone. The audio circuit 1360 may convert received audio data into an electric signal and transmit the electric signal to the speaker 1361. The speaker 1361 converts the electric signal into a sound signal for output. On the other hand, the microphone 1362 converts a collected sound signal into an electric signal. The audio circuit 1360 receives the electric signal and converts the electric signal into audio data, and outputs the audio data to the processor 1380 for processing. Then, the processor 1380 transmits the audio data to, for example, another mobile phone by using the RF circuit 1310, or outputs the audio data to the memory 1320 for further processing.

Wi-Fi is a short distance wireless transmission technology. The mobile phone may help, by using the Wi-Fi module 1370, the user to receive and transmit e-mails, browse a webpage, access streaming media, and the like, which provides wireless broadband Internet access for the user. Although FIG. 13 shows the Wi-Fi module 1370, it may be understood that the Wi-Fi module 1370 is not a necessary component of the mobile phone, and when required, the Wi-Fi module 1370 may be omitted without changing the scope of the essence of the present disclosure.

The processor 1380 is the control center of the mobile phone, and is connected to various parts of the mobile phone by using various interfaces and lines. By running or executing the software program and/or module stored in the memory 1320, and invoking data stored in the memory 1320, the processor 980 performs various functions and data processing of the mobile phone, thereby performing overall monitoring on the mobile phone. Optionally, the processor 1380 may include one or more processing units. Preferably, the processor 1380 may integrate an application processor and a modem. The application processor mainly processes an operating system, a user interface, an application, and the like. The modem mainly processes wireless communication. It may be understood that the modem may alternatively not be integrated into the processor 1380.

The mobile phone further includes the power supply 1390 (such as a battery) for supplying power to the components. Preferably, the power supply may be logically connected to the processor 1380 by using a power management system, thereby implementing functions such as charging, discharging and power consumption management by using the power management system.

Although not shown in the figure, the mobile phone may further include a camera, a Bluetooth module, and the like, which are not described herein. In addition, the mobile phone may further include a graphics processing unit (GPU). A feature extraction model and a target detection model may be run through the GPU. The GPU and the processor 1380 communicate with each other, to implement the target tracking method according to the embodiments of this application. Certainly, the feature extraction model and the target detection model may alternatively be run on the processor 1380, to implement functions thereof.

In the embodiments of this application, the processor 1380 included in the terminal further has the following functions:

obtaining a first video stream, and performing the following data processing for a video frame in the first video stream, to implement target tracking in the first video stream, the data processing including:

performing detection according to a target detection model and a current video frame, to obtain candidate regions in the current video frame;

performing extraction according to a feature extraction model and the candidate regions, to obtain deep features corresponding to the candidate regions, the feature extraction model being an end-to-end neural network model that uses an image as an input and uses a deep feature of a movable body in the image as an output;

calculating feature similarities corresponding to the candidate regions according to the deep features corresponding to the candidate regions and a deep feature of a target detected in a previous video frame; and determining, according to the feature similarities corresponding to the candidate regions, the target detected in the current video frame.

Optionally, the processor 1380 may further perform method steps of any specific implementation of the target tracking method in the embodiments of this application.

An embodiment of this application further provides a computer-readable storage medium, configured to store program code, the program code being configured to perform any implementation in the target tracking methods described in the foregoing embodiments.

An embodiment of this application further provides a computer program product including an instruction, the computer program product, when running on a computer, causing the computer to perform any implementation in the target tracking methods described in the foregoing embodiments.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in the form of hardware, or may be implemented in the form of a software functional unit.

If the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM for short), a random access memory (RAM for short), a magnetic disk, or an optical disc.

The foregoing embodiments are merely provided for describing the technical solutions of the embodiments of this application, but not intended to limit this application. A person of ordinary skill in the art shall understand that although the embodiments of this application have been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

INDUSTRIAL APPLICABILITY

The embodiments of this application provide a target tracking method. In the target tracking method, target detection is performed in an overall range of the current video frame by using the target detection model, to determine all candidate regions existing in the current video frame, so as to determine a tracking target based on the determined candidate regions. As compared with the related art in which a target tracking range of a current video frame is determined according to a target region of a previous video frame, and target tracking is performed only in the target tracking range, in the embodiments of this application, the candidate regions are determined in the overall range of the video frame by using the target detection model, and the range of target tracking is enlarged, so that occurrence of a case of losing a tracking target due to excessively fast movement of the tracking target can be effectively prevented. In addition, in the target tracking method provided in the embodiments of this application, deep features of the determined candidate regions are extracted by using the feature extraction model, and the target is determined based on the deep features of the candidate regions and the deep feature of the target detected in the previous video frame. As compared with the related art in which target tracking is performed only based on a morphological feature, in the embodiments of this application, the tracking target is determined based on the deep feature, so that it can be ensured that the determined tracking target is more accurate, and occurrence of a case of a tracking drift can be effectively prevented.

What is claimed is:

1. A target tracking method, performed by an electronic device having a processor and memory connected to the processor and storing processor-executable instructions, the method comprising:
    establishing, by the electronic device, a connection with a plurality of cameras via a communications interface of the electronic device, wherein each camera has a unique location and a corresponding shooting range;
    obtaining, by the electronic device via the communications interface, a first video stream acquired by a first camera of the plurality of cameras;
    inputting, by the electronic device, a current video frame of the first video stream into a target detection model and obtaining, from the target detection model, an output of the current video frame that includes a plurality of border boxes, each border box corresponding to a respective candidate region of a plurality of candidate regions in the current video frame;
    inputting, by the electronic device, the plurality of candidate regions into a feature extraction model and obtaining, from the feature extraction model, deep features of movable bodies corresponding to the candidate regions, the feature extraction model being an end-to-end neural network model that uses an image as an input and uses a deep feature of a movable body in the image as an output;
    calculating, by the electronic device for each of the plurality of candidate regions in the current video frame, feature similarities between the deep features corresponding to a respective candidate region in the current video frame and deep features corresponding to a target detected in a previous video frame;
    determining, by the electronic device, that the target is detected in the current video frame according to the feature similarities, further including:
        selecting, from the plurality of candidate regions, a first plurality of candidate regions whose associated feature similarities exceed a threshold according to the calculated feature similarities, each of the first plurality of candidate regions having an associated motion direction;
        selecting, from the first plurality of candidate regions, a first candidate region whose associated motion direction most matches a motion direction of the target detected in the previous video frame, as a first target region in the current video frame; and
        determining that the target is detected within the first target region in the current video frame and its physical location on a map according to the location and shooting range of the first camera;
    determining, by the electronic device, a motion trajectory of the target on the map according to the physical location of the target detected in the first video stream; and
    determining, by the electronic device and among the plurality of cameras, a second camera that captures the target after the target disappears from the shooting range of the first camera according to the motion trajectory of the target on the map and the location and shooting range of the second camera.

2. The method according to claim 1, wherein determining, by the electronic device, that the target is detected in the current video frame according to the feature similarities comprises:
    selecting a candidate region having a highest feature similarity among the feature similarities corresponding to the candidate regions respectively, as a target region of the current video frame; and
    determining that the target is detected within the target region in the current video frame.

3. The method according to claim 1, wherein determining, by the electronic device, that the target is detected in the current video frame according to the feature similarities further includes:
    selecting a second plurality of candidate regions whose associated feature similarities exceed a threshold according to the feature similarities corresponding to the candidate regions respectively, each of the second plurality of candidate regions having an associated distance from a physical location of the target detected in the previous video frame;
    selecting, from the second plurality of candidate regions, a second candidate region having a smallest distance from the physical location of the target detected in the previous video frame, as a second target region in the current video frame; and
    determining that the target is detected within the second target region in the current video frame.

4. The method according to claim 1, wherein determining, by the electronic device, that the target is detected in the current video frame according to the feature similarities further includes:
    selecting a third plurality of candidate regions whose associated feature similarities exceed a threshold according to the feature similarities corresponding to the candidate regions respectively, each of the third plurality of candidate regions having an associated physical location and a move direction;
    selecting, from the third plurality of candidate regions, a third candidate region whose associated physical location and move direction most match a physical location and a motion direction of the target detected in the previous video frame respectively, as a third target region of the current video frame; and
    determining that the target is detected within the third target region in the current video frame.

5. The method according to claim 1, wherein the method further comprises:
    performing, by the electronic device via the target detection model and the feature extraction model, cross-tracking between the first video stream captured by the first camera and the second video stream captured by the second camera.

6. The method according to claim 1, wherein a physical location of a candidate region within the current video frame is determined by a location coordinate mapping model.

7. The method according to claim 6, wherein the location coordinate mapping model is generated by:
    calculating, by using a perspective transformation formula, a coordinate mapping matrix according to location coordinates of at least four location points on a preset calibration image and physical location coordinates of the at least four location points on a physical world ground; and
    generating the location coordinate mapping model according to the coordinate mapping matrix.

8. The method according to claim 1, further comprising:
drawing, by the electronic device, a motion trajectory of the target on a map according to a physical location of the target detected in the first video stream.

9. The method according to claim 1, wherein the target detection model comprises:
a basic network and an auxiliary network, wherein the basic network uses a lightweight convolutional neural network mobilenet, and the auxiliary network uses a detection layer formed by a convolution kernel, an input of the auxiliary network being a feature map outputted by different convolutional layers of the basic network.

10. The method according to claim 1, further comprising:
obtaining, by the electronic device, an image sample, the image sample comprising a human body image and an image tag; and
constructing, by the electronic device, a deep convolutional neural network initial model, and training the deep convolutional neural network initial model by using the image sample, to obtain a deep convolutional neural network model meeting a training ending condition as the feature extraction model.

11. The method according to claim 1, wherein the current video frame is a video frame located after a first video frame in the first video stream, and the deep feature of the target detected in the previous video frame is a deep feature of a target that is tracked in the first video frame and that is extracted by using the feature extraction model.

12. The method of claim 3, wherein selecting, from the second plurality of candidate regions, the second candidate region having a smallest distance from the physical location of the target detected in the previous video frame, as the second target region in the current video frame includes:
converting, by the electronic device via a location coordinate mapping model, image locations corresponding to the second plurality of candidate regions into physical locations;
converting, by the electronic device via a location coordinate mapping model, an image location of the tracking target detected in the previous video frame into a physical location;
determining a plurality of displacement values for the second plurality of candidate regions, each of the displacement values corresponding to a displacement between a respective physical location corresponding to a respective one of the second plurality of candidate regions and the physical location of the tracking target detected in the previous video frame; and
selecting the second candidate region in accordance with the smallest determined displacement value.

13. An electronic device, comprising:
a processor;
memory connected to the processor, wherein the memory stores processor-executable instructions that, when executed by the processor, cause the electronic device to perform a plurality of operations including:
establishing, by the electronic device, a connection with a plurality of cameras via a communications interface of the electronic device, wherein each camera has a unique location and a corresponding shooting range;
obtaining, by the electronic device via the communications interface, a first video stream acquired by a first camera of the plurality of cameras;
inputting, by the electronic device, a current video frame of the first video stream into a target detection model and obtaining. from the target detection model, an output of the current video frame that includes a plurality of border boxes, each border box corresponding to a respective candidate region of a plurality of candidate regions in the current video frame;
inputting, by the electronic device, the plurality of candidate regions into a feature extraction model and obtaining, from the feature extraction model, deep features of movable bodies corresponding to the candidate regions, the feature extraction model being an end-to-end neural network model that uses an image as an input and uses a deep feature of a movable body in the image as an output;
calculating, by the electronic device for each of the plurality of candidate regions in the current video frame, feature similarities between the deep features corresponding to a respective candidate region in the current video frame and deep features corresponding to a target detected in a previous video frame;
determining, by the electronic device, that the target is detected in the current video frame according to the feature similarities, further including:
selecting, from the plurality of candidate regions, a first plurality of candidate regions whose associated feature similarities exceed a threshold according to the calculated feature similarities, each of the first plurality of candidate regions having an associated motion direction;
selecting, from the first plurality of candidate regions, a first candidate region whose associated motion direction most matches a motion direction of the target detected in the previous video frame, as a first target region in the current video frame; and
determining that the target is detected within the first target region in the current video frame and its physical location on a map according to the location and shooting range of the first camera;
determining, by the electronic device, a motion trajectory of the target on the map according to the physical location of the target detected in the first video stream; and
determining, by the electronic device and among the plurality of cameras, a second camera that captures the target after the target disappears from the shooting range of the first camera according to the motion trajectory of the target on the map and the location and shooting range of the second camera.

14. The electronic device according to claim 13, wherein determining, by the electronic device, that the target is detected in the current video frame according to the feature similarities comprises:
selecting a candidate region having a highest feature similarity among the feature similarities corresponding to the candidate regions respectively, as a target region of the current video frame; and
determining that the target is detected within the target region in the current video frame.

15. The electronic device according to claim 13, wherein [determining, by the electronic device, that the target is detected in the current video frame according to the feature similarities further includes:
selecting a second plurality of candidate regions whose associated feature similarities exceed a threshold according to the feature similarities corresponding to the candidate regions respectively, each of the second plurality of candidate regions having an associated distance from a physical location of the target detected in the previous video frame;

selecting, from the second plurality of candidate regions, a second candidate region having a smallest distance from the physical location of the target detected in the previous video frame, as a second target region in the current video frame; and
determining that the target is detected within the second target region in the current video frame.

16. The electronic device according to claim 13, wherein determining, by the electronic device, that the target is detected in the current video frame according to the feature similarities further includes:
selecting a third plurality of candidate regions whose associated feature similarities exceed a threshold according to the feature similarities corresponding to the candidate regions respectively, each of the third plurality of candidate regions having an associated physical location and a move direction;
selecting, from the third plurality of candidate regions, a third candidate region whose associated physical location and move direction most match a physical location and a motion direction of the target detected in the previous video frame respectively, as a third target region of the current video frame; and
determining that the target is detected within the third target region in the current video frame.

17. The electronic device according to claim 13, wherein the plurality of operations further comprise:
performing, by the electronic device via the target detection model and the feature extraction model, cross-tracking between the first video stream captured by the first camera and the second video stream captured by the second camera.

18. The electronic device according to claim 13, wherein the plurality of operations further comprise:
drawing a motion trajectory of the target on a map according to a physical location of the target detected in the first video stream.

19. A non-transitory computer-readable storage medium storing a plurality of processor-executable instructions in connection with an electronic device having a processor, wherein the plurality of processor-executable instructions, when executed by the processor, cause the electronic device to perform a plurality of operations including:
establishing, by the electronic device, a connection with a plurality of cameras via a communications interface of the electronic device, wherein each camera has a unique location and a corresponding shooting range;
obtaining, by the electronic device via the communications interface, a first video stream acquired by a first camera of the plurality of cameras;
inputting, by the electronic device, a current video frame of the first video stream into a target detection model and obtaining, from the target detection model, an output of the current video frame that includes a plurality of border boxes, each border box corresponding to a respective candidate region of a plurality of candidate regions in the current video frame;
inputting, by the electronic device, the plurality of candidate regions into a feature extraction model and obtaining, from the feature extraction model, deep features of movable bodies corresponding to the candidate regions, the feature extraction model being an end-to-end neural network model that uses an image as an input and uses a deep feature of a movable body in the image as an output;
calculating, by the electronic device for each of the plurality of candidate regions in the current video frame, feature similarities between the deep features corresponding to a respective candidate region in the current video frame and deep features corresponding to a target detected in a previous video frame;
determining, by the electronic device, that the target is detected in the current video frame according to the feature similarities, further including:
selecting, from the plurality of candidate regions, a first plurality of candidate regions whose associated feature similarities exceed a threshold according to the calculated feature similarities, each of the first plurality of candidate regions having an associated motion direction;
selecting, from the first plurality of candidate regions, a first candidate region whose associated motion direction most matches a motion direction of the target detected in the previous video frame, as a first target region in the current video frame; and
determining that the target is detected within the first target region in the current video frame and its physical location on a map according to the location and shooting range of the first camera;
determining, by the electronic device, a motion trajectory of the target on the map according to the physical location of the target detected in the first video stream; and
determining, by the electronic device and among the plurality of cameras, a second camera that captures the target after the target disappears from the shooting range of the first camera according to the motion trajectory of the target on the map and the location and shooting range of the second camera.

* * * * *